United States Patent [19]
Sternglass et al.

[11] Patent Number: 5,995,025
[45] Date of Patent: Nov. 30, 1999

[54] FOLDING KEYBOARD WITH SLIDING SEGMENTS FOR ELECTRONIC PRODUCTS

[75] Inventors: Daniel I. Sternglass, 403 Highgate Rd., Ithaca, N.Y. 14850; Donald F. Grube, Rochester, N.Y.

[73] Assignee: Daniel I. Sternglass, Ithaca, N.Y.

[21] Appl. No.: 08/993,926

[22] Filed: Dec. 18, 1997

[51] Int. Cl.$^6$ .................................................. H03K 17/94
[52] U.S. Cl. ........................... 341/22; 361/680; 400/489; 345/169
[58] Field of Search ............................... 341/22; 361/680, 361/681; 400/489; 345/168, 169

[56] References Cited

U.S. PATENT DOCUMENTS

| | | |
|---|---|---|
| D. 254,554 | 3/1980 | Genaro et al. . |
| D. 299,030 | 12/1988 | Menn . |
| D. 322,246 | 12/1991 | Izaki . |
| D. 324,035 | 2/1992 | Izaki . |
| 3,940,758 | 2/1976 | Margolin . |
| 4,739,451 | 4/1988 | Kuba . |
| 4,896,787 | 1/1990 | Delamour et al. . |
| 5,187,644 | 2/1993 | Crisan . |
| 5,260,884 | 11/1993 | Stern . |
| 5,267,127 | 11/1993 | Pollitt . |
| 5,278,779 | 1/1994 | Conway et al. . |
| 5,287,245 | 2/1994 | Lucente et al. . |
| 5,457,453 | 10/1995 | Chiu et al. . |
| 5,519,569 | 5/1996 | Sellers . |
| 5,526,226 | 6/1996 | Katoh et al. . |
| 5,543,787 | 8/1996 | Karidis et al. . |
| 5,543,790 | 8/1996 | Goldstein . |
| 5,544,005 | 8/1996 | Horikoshi et al. . |
| 5,659,307 | 8/1997 | Karidis et al. . |
| 5,687,058 | 11/1997 | Roylance . |
| 5,703,578 | 12/1997 | Allison . |
| 5,706,167 | 1/1998 | Lee . |
| 5,708,562 | 1/1998 | Agata et al. . |

*Primary Examiner*—Michael Horabik
*Assistant Examiner*—Timothy Edwards, Jr.
*Attorney, Agent, or Firm*—Nixon Peabody LLP

[57] ABSTRACT

An expandable keyboard in accordance with the present invention provides a full-size or expanded keyboard for typing which folds to minimize size during transport or storage, and can be converted to substantially twice its folded length for use. Its use of sliding segments permits a straight hinge line for folding. Its operating mechanism supports a large number of electrical interconnections between the hinged wing section or sections and the central platform, and provides for straight-line engagement as well as environmental and ESD protection of the mating electrical connectors. It permits the operation of removable modules such as PCMCIA cards or fixed circuitry such as speakers or keypads in the wing section or sections in both their open and closed positions. It includes a central keyboard assembly and a first assembly comprising a first segment and a first wing. The central keyboard assembly includes one or more keys and a platform. The first wing is pivotally connected along one side to one side of the platform about a first axis and is pivotable to a closed position where the first wing rests substantially on the platform and to an open position where the first wing provides an extension of the platform. The first segment is slidably connected to the first wing and is moveable to a first position which exposes the first axis and permits the first wing to pivot about the first axis and to a second position which covers the first axis and substantially prevents the first wing from pivoting about the first axis. The expandable keyboard may also include a second assembly comprising a second segment and a second wing, pivotally connected along one side of the platform about a second axis, which operates in the same manner as the first wing.

30 Claims, 30 Drawing Sheets

FOLDING KEYBOARD WITH SLIDING SEGMENTS FOR ELECTRONIC PRODUCTS

FIELD OF THE INVENTION

This invention relates generally to a keyboard and, more particularly, to a keyboard with one or more assemblies which slide and fold with respect to each other to minimize the overall size of the keyboard.

BACKGROUND

Keyboards are used in a variety of different portable and stationary applications, such as palmtop or hand-held computers, notebook computers, sub-notebook computers, digital organizers or personal digital assistants (PDAs), digital cameras with annotation or editing capability, data-capable mobile phones, video consumer game electronics, entertainment electronics, calculators, stationary telephones, and small form-factor stationary (desktop) computers, to enter text, numerical, and/or control information. In many of these portable and stationary applications, it is desirable for the overall size of the keyboards to be reduced when the keyboards and products are stored and transported, especially for portable applications. However, during use, it is desirable for the keyboards to conform to standard sizes to have a typical "feel" for ease and comfort of use. The overall size of the keyboard is particularly critical for text entry via "touch typing." As discussed below, a variety of different types of keyboards have been developed to meet these contradictory requirements with varying degrees of success.

One solution to achieve both small overall size during storage and transport and standard size during use is the "fixed segment", i.e. no sliding segments, folding keyboard design. Characteristic of these designs is that the keyboard is divided into segments which fold, but do not slide and with the keys maintaining a fixed position on the segment. They are then hinged in a manner that permits the keys to properly align when the keyboard is in the open position. Examples of this design are set forth in U.S. Pat. No. 3,940,758 to Margolin, U.S. Pat. No. 5,187,644 to Crisan, U.S. Pat. No. 5,278,779 to Conway et al., U.S. Pat. No. 5,457,453 to Chiu et al., U.S. Pat. No. 5,519,569 to Sellers, U.S. Design Pat. No. 254,554 to Genaro et al., U.S. Design Pat. No. 299,030 to Menn, U.S. Design Pat. No. 322,246 to Izaki, and U.S. Design Pat. No. 324,035 to Izaki which are all herein incorporated by reference.

One of the problems with this prior design is with the electrical interconnections between the central segment and the folding segment which arise from two issues. First, because the layout of a standard typing keyboard offsets the rows of keys, the ends of the keyboard segments present a "stepped" pattern. This complicates and limits the available methods of electrical interconnection between the segments and makes it very difficult to provide Electro Static Discharge (ESD) protection at the points of interconnection when the keyboard is in the folded state. The "stepped" pattern when the keyboard is in the folded state presents mechanical problems with providing a mechanically and aesthetically suitable protective cover, often dictating a complicated cover with multiple hinged segments to protect the exposed edges from ESD, environmental and impact damage. Second, the pivoting nature of the folding segment with respect to the central segment brings the one set of the interconnecting mating electrical connectors in towards the other set of connectors at an arc, rather than straight on, which imposes limitations on the interconnection methods. Typically, the electrical interconnection is made either by a flexible ribbon type connector or by interconnecting mating electrical connectors along the side of each segment which are joined together. Unfortunately, the flexible ribbon type connectors are subject to fatigue over time from the bending and can fray and break. Due to the arc-shaped path followed by the opening keyboard segment when opened, it is impossible to use an interconnection method that relies on mating connecting members approaching along a straight-line path, or upon continuous, uniform compression from the top to the bottom of the connecting region.

Another problem with this design is that when the folding segments are folded out from the central segment they are not securely held in place. As a result, the resulting expanded or full size keyboard is flimsy unless an additional locking mechanism is provided.

Another design to achieve both small overall size during storage and transport and standard size during use is disclosed in U.S. Pat. No. 5,267,127 to Pollitt which is herein incorporated by reference. In this design, the keyboard assembly is split in half and each half of the keyboard assembly can be slid along a keyboard axis between a split position and a connected position. The halves of the keyboard assembly are not folded with respect to each other.

One of the problems with this design is that the width or depth of the electronic product on which the halves of the keyboard assembly ride on and are stored on is still fairly large. It is a property of this design that the degree of expansion in the overall length of the keyboard is in proportion to the depth of the unit. As a result, overall size is not significantly reduced. Additionally, because the size is not significantly reduced, this design is not desirable for some smaller applications, such as handheld computers or mobile telephones.

SUMMARY

An expandable keyboard in accordance with the present invention includes a central keyboard assembly and a first assembly comprising a first segment and a first wing. The central keyboard assembly includes one or more keys and a platform. The first wing is pivotally connected along one side to one side of the platform about a first axis and is pivotable to a closed position where the first wing rests substantially on the platform and to an open position where the first wing provides an extension of the platform. The first segment is slidably connected to the first wing and is moveable to a first position which exposes the first axis and permits the first wing to pivot about the first axis, and to a second position which covers the first axis and substantially prevents the first wing from pivoting about the first axis. The expandable keyboard may also include a second assembly comprising a second segment and a second wing. The second wing is pivotally connected along one side to one side of the platform about a second axis and is pivotable to a closed position where the second wing rests substantially on the platform and to an open position where the second wing provides an extension of the platform. The second segment is slidably connected to the second wing and is moveable to a first position which exposes the second axis and permits the second wing to pivot about the second axis and to a second position which covers the second axis and substantially prevents the second wing from pivoting about the second axis.

An expandable keyboard in accordance with the present invention provides several advantages. For example, the expandable keyboard can easily be made small and compact for storage and can easily be converted to up to substantially twice its folded length for use. Additionally, the sliding segment is designed to provide a large number of inexpensive and optimized interconnections between the central assembly and the first and second assemblies because the first and second assemblies are brought into electrical contact with the central assembly along a straight line, rather than in an arc. A large number of interconnections capable of transporting both power and low-level signals is highly desirable due to the ability to locate circuitry or removable modules like PCMCIA cards in the wing sections. Further, when the first and second wings are folded to an open position and the first and second segments are slid into the second position they provide a sturdy and durable standard size keyboard. The duplication of the electrical connections between the edge of the keyboard segments and the top surfaces of the central keyboard and the movable segments permits operation of any circuitry or removable PCMCIA or Smart cards, keypads, speakers, microphones etc. contained in the wings when the wings are in the closed position. The invention also provides automatically operated ESD protection for all electrical contacts during both storage and operation with the keyboard open or closed.

DETAILED DESCRIPTION

Figure 1A:
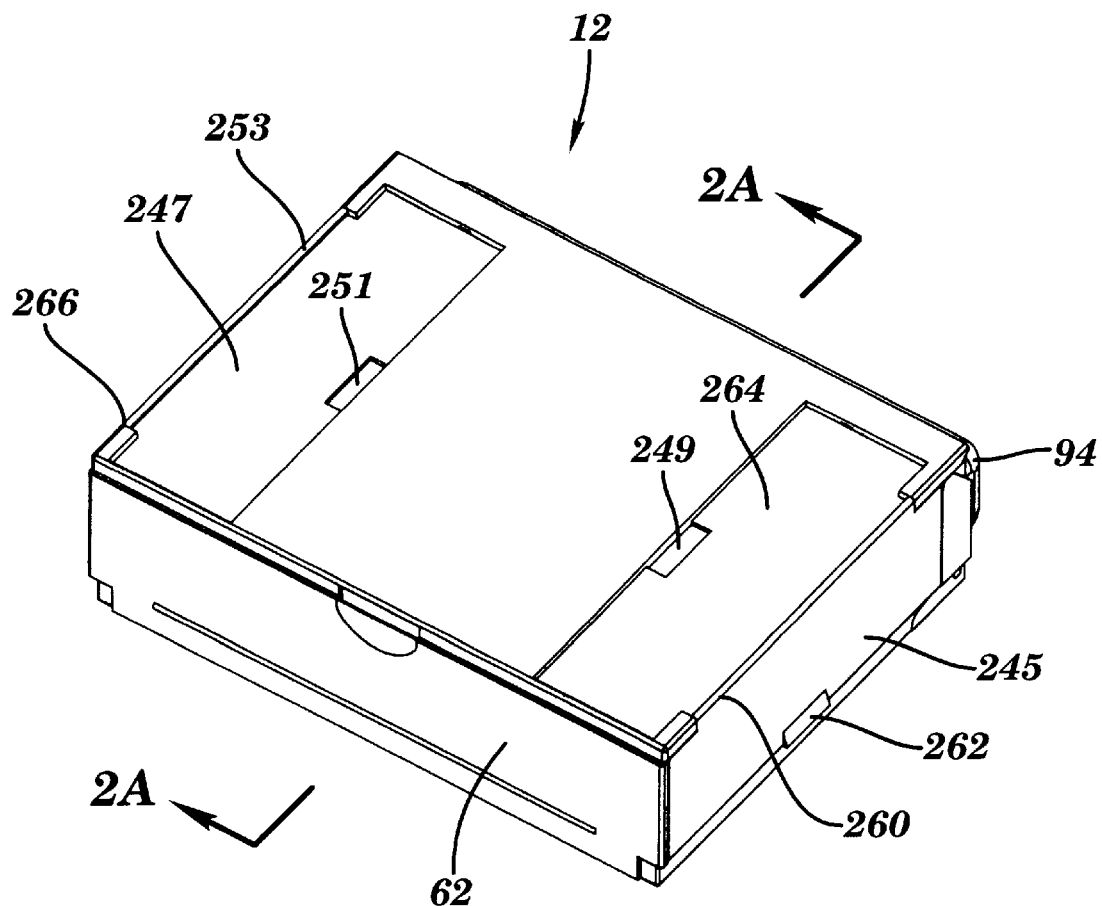
FIG. 1A is a front perspective view of one embodiment of the expandable keyboard in accordance with the present invention in a portable computer in a fully closed position.

One embodiment of an expandable keyboard 10 in accordance with the present invention in a portable computer 12 is illustrated in FIGS. 1A–1E. The expandable keyboard 10 includes a central keyboard assembly 14, a right keyboard assembly 16 comprising a first segment 18 and a first wing 20, and a left keyboard assembly 22 comprising a second segment 24 and a second wing 26. The expandable keyboard 10 provides a number of advantages including providing a keyboard that can easily be made small and compact for storage and standard size for use. Additionally, the expandable keyboard 10 provides a large number of optimized and reliable electrical interconnects, serving the keyboard segments and additional circuitry or removable modules, such as PCMCIA cards, incorporated into the right and left keyboard assemblies, between the central assembly 14 and right and left keyboard assemblies 16 and 22.

Referring more specifically to FIGS. 1C, 1D, 2A, 3D, and 4A–4C, the central keyboard assembly 14 includes keys 28 and a keyboard-base 30. Each of the keys 28 is substantially the same size as keys found on a standard keyboard. It is readily apparent that other embodiments of this expandable keyboard may have larger size keyboards or smaller size keyboards for pocket size devices. The keys 28 on the central keyboard assembly 14 only comprise a portion of the keys normally found on a standard size keyboard. The remaining keys 32 and 34 are located on the right and left keyboard assemblies 16 and 22 described below. Each key 28 is normally held in a raised position above the keyboard-base 30 by a biasing device containing an electrical switch (not shown) connected between the keyboard-base 30 and each key 28. Each of the key tops is normally held in substantially the same plane. When a key 28 is depressed, the key 28 completes a connection which is typically coupled to circuitry in the electrical product, in this example the portable computer 12. Such a coupling may be entirely internal within the electronic device, or may involve a cable or wireless means depending on the environment where the keyboard is deployed. Depending on the requirements of a particular application, tradeoffs are often made between the "touch typing quality" of a keyboard and the acceptable thickness of the keyboard. Although one type of key 28 is illustrated and described, other types of keys, such as dome switches or membrane keys, with or without rigid keycaps, can also be used alone or in combination as needed or desired.

Figure 3A:
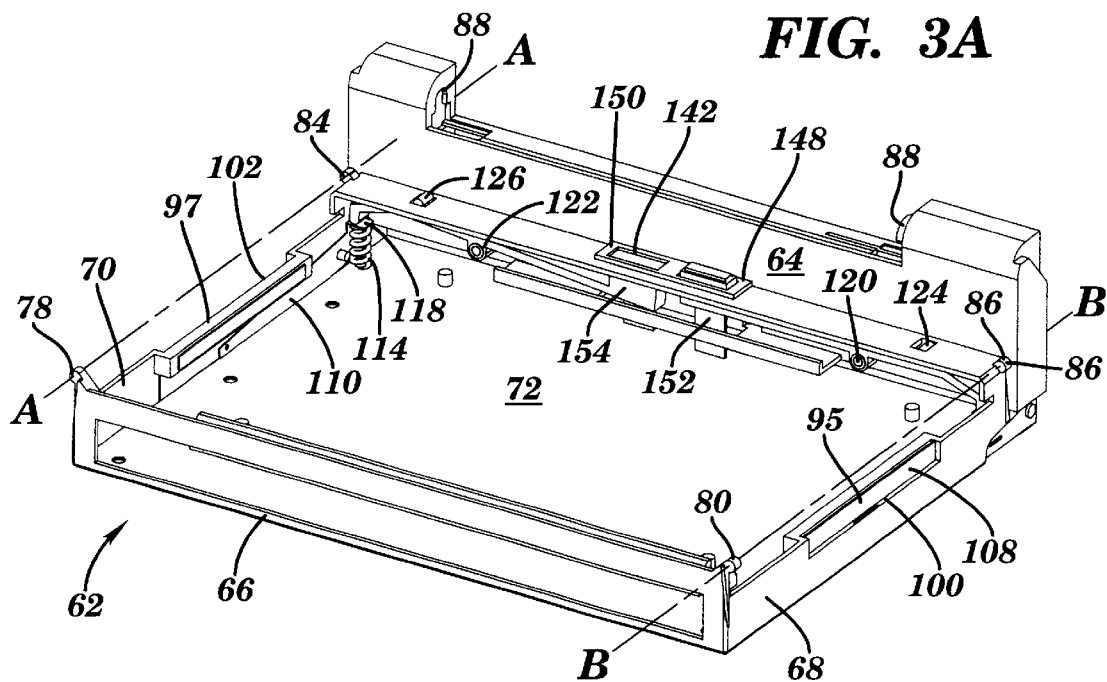
FIG. 3A is a perspective view from one side of the platform for the central keyboard assembly.

In this particular embodiment, the keys 32 and 34 are electrically coupled to the central keyboard, which in turn is coupled to the main circuit board 37. Additionally, each of the components contained within the right, and left keyboard assemblies 14, 16, and 22, such as PCMCIA or smart card slots, microphones, speakers, back-side keypads or other internal circuitry, are coupled to the computer's main circuit board. The central keyboard assembly 14 which is coupled to main circuit board or circuitry 37 for the electronic product, is shown in FIG. 3D. The main circuit board of the personal computer for this particular embodiment includes a variety of components, such as a CPU, RAM, ROM, display, and an I/O device, although the circuitry 37 could have other components as needed or desired. By way of example only, U.S. Pat. No. 5,267,127 to Pollitt, discloses circuitry for a portable computer and its operation in greater detail, which is herein incorporated by reference. Although in this particular embodiment, the central, right, and left keyboard assemblies 14, 16, and 22 are integrally formed into the computer 12, the central, right, and left keyboard assemblies 14, 16, and 22 could be coupled to an input/output device on the keyboard 10 which is coupled to an input/output device on the computer 12 coupled to circuitry 37. This would be the case if the keyboard were located in a separate housing from the computer, and thus coupled by a cable or by Infra-Red, RF or other wired or wireless means.

The keyboard-base 30 for the central keyboard assembly 14 includes opposing side edges 46 and 48, a front edge 50, and a back edge 52. Due to the fact that in this particular embodiment, a standard size keyboard is broken into sections which are found in the central, right, and left keyboard assemblies 14, 16, and 22 and to the fact that keys on a standard size keyboard keys are normally arranged in angled columns, the side edges 46 and 54 at the break between the central keyboard assembly 14 and the right keyboard assembly 16 and the side edges 48 and 56 at the break between the central keyboard assembly 14 and the left keyboard assembly 22 are not straight and are patterned around the arrangement of the break between keys 28 and 32 and between keys 28 and 34. Although in this particular embodiment, a standard size keyboard is split between the central, right, and left keyboard assembles 14, 16, and 22 (three segments), the standard size keyboard could be split between just the central and right keyboard assemblies 14 and 16 (two segments), the central and left keyboard assemblies 14 and 22 (two segments), or could all be located on just on the central keyboard assembly 14 with other electronic components, such as microphones, telephone key pads, or slot for electronic cards such as PCMCIA or smart cards, located on the right and/or the left keyboard assemblies 16 and 22 (one keyboard segment plus outboard segments for I/O). The front and back edges 50 and 52 of the keyboard-base 30 for the central keyboard assembly 14 each include a lip 58 and 60 which extends out past the front and back rows of keys 28.

Referring to FIGS. 1C, 1D, 1E, 2A–2C, and 3A–3C, the central keyboard assembly 14 also includes a platform 62 which in this particular embodiment has a back wall 64, a front wall 66, opposing side walls 68 and 70, and a floor 72 connected together to form a substantially rectangular shaped-structure. Additionally, in this particular embodiment the main circuit board or circuitry 37 for the portable computer is located on the floor 72 of the platform 62 for the central keyboard assembly 14, although all or part of it could be located elsewhere as needed or desired. When the expandable keyboard is used in other portable or stationary applications, the expandable keyboard 10 may simply be coupled via a connector, a cable, or other wired or wireless means to the location where circuitry for the particular application is contained.

Figure 2A:
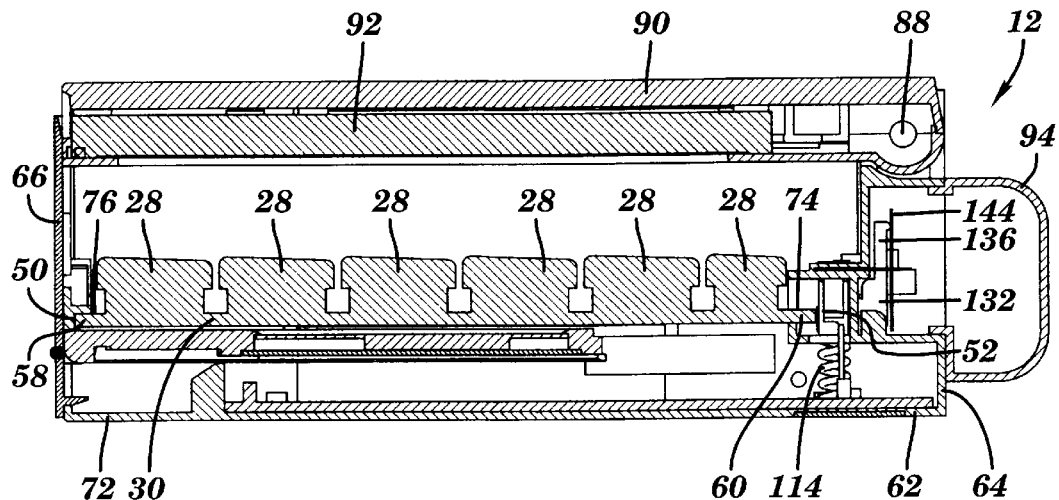
FIG. 2A is a cross-sectional view of the expandable keyboard in the portable computer in a fully closed position taken along lines 2A—2A in FIG. 1A, with the wing keyboard segment omitted for clarity.
Figure 2B:
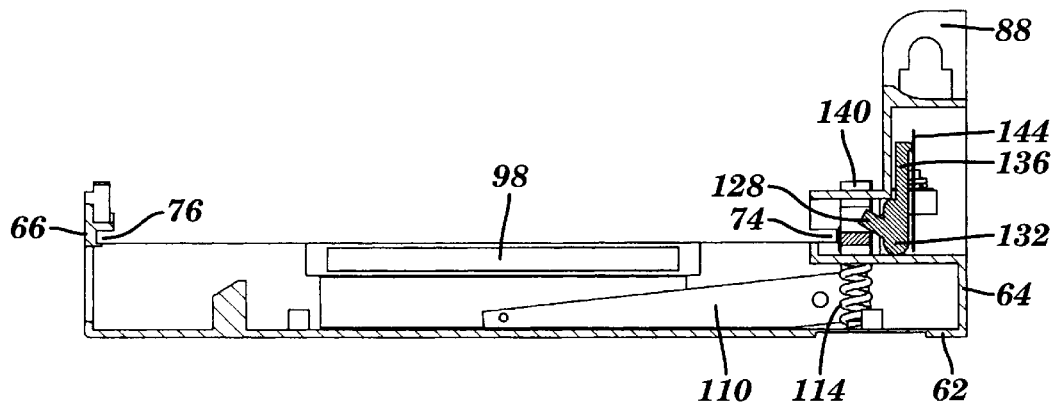
FIG. 2B is a cross-sectional view of the expandable keyboard in the portable computer shown in FIG. 2A with a the central keyboard assembly, the hinged wing sections and portions of the portable computer removed.
Figure 2C:
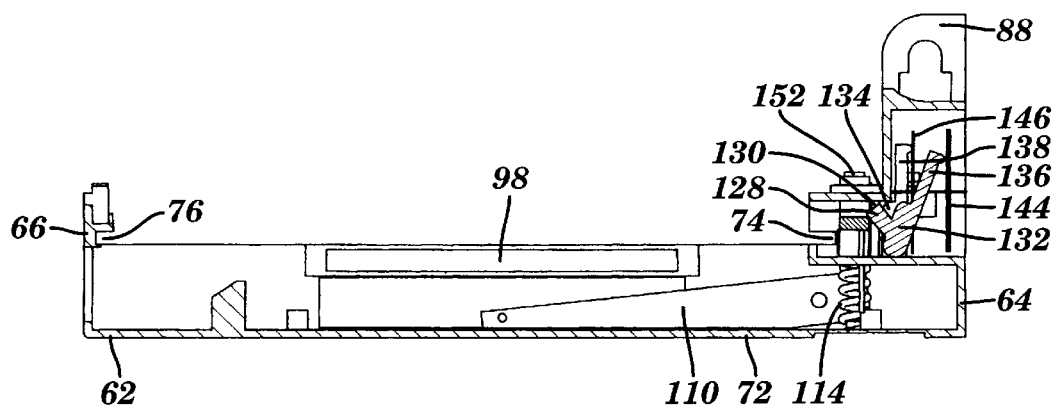
FIG. 2C is another cross-sectional view of the expandable keyboard shown in FIG. 2A in the portable computer with the central keyboard assembly, the hinged wing sections and portions of the portable computer removed.

Referring to FIGS. 2A–2C, a channel 74 is formed on the inner surface of the back wall 64 and another channel 76 is formed on the inner surface of the front wall 66. The lip 60 adjacent the back edge 52 of the keyboard-base 30 for the central keyboard assembly 14 is seated in the channel 74 and the lip 58 adjacent the front edge 50 of the keyboard-base 30 or the central keyboard assembly 14 is seated in the channel 76. Although not shown, the keyboard-base 30 for the central keyboard assembly 14 may also be secured to the inner surface of the side walls 68 and 70.

Referring to FIGS. 1C, 1D, and 3A–3C, one part 78 of a pivotal connection is located adjacent one of the top corners of the front wall 66 and one part 80 of another pivotal connection is located adjacent the other top corner of the front wall 66. Each of these parts 78 and 80 of the pivotal connection comprise a tab which extends out from the top corner of the front wall 66 and has an opening to receive a pivot pin. A top strip 82 is seated between the opposing side walls 68 and 70 and adjacent to the back wall 64. The top strip 82 also has one part 84 of a pivotal connection located adjacent one top corner of one of the opposing side walls and has one part 86 of another pivotal connection located adjacent one top corner of the other one of the opposing side walls 68 and 70. Again, each part 84 and 86 of the pivotal connection is a tab which extends out from the top strip 82 and has an opening to receive a pivot pin. The openings in parts 78 and 84 are located along a first axis A-A and the openings in parts 80 and 86 are located along a second axis B-B. Although one type of pivotal connection is disclosed, other types of pivoting structures, such as one or more living hinges, can also be used as needed or desired.

Referring to FIGS. 1B–1E, 2A–2C and 3C–3D, the back wall 64 has a hinge structure 88 for pivotally connecting a cover 90 of the portable computer 12 to the back wall 64 of the platform 62. The cover 90 houses a display 92 which is coupled to the circuitry 37 for the portable computer 12 on the floor 72 of the platform 62. The back wall 64 may also have a detachable housing 94 for holding a battery for the circuitry 37, display 92 and other components for the portable computer 12.

Figure 3B:
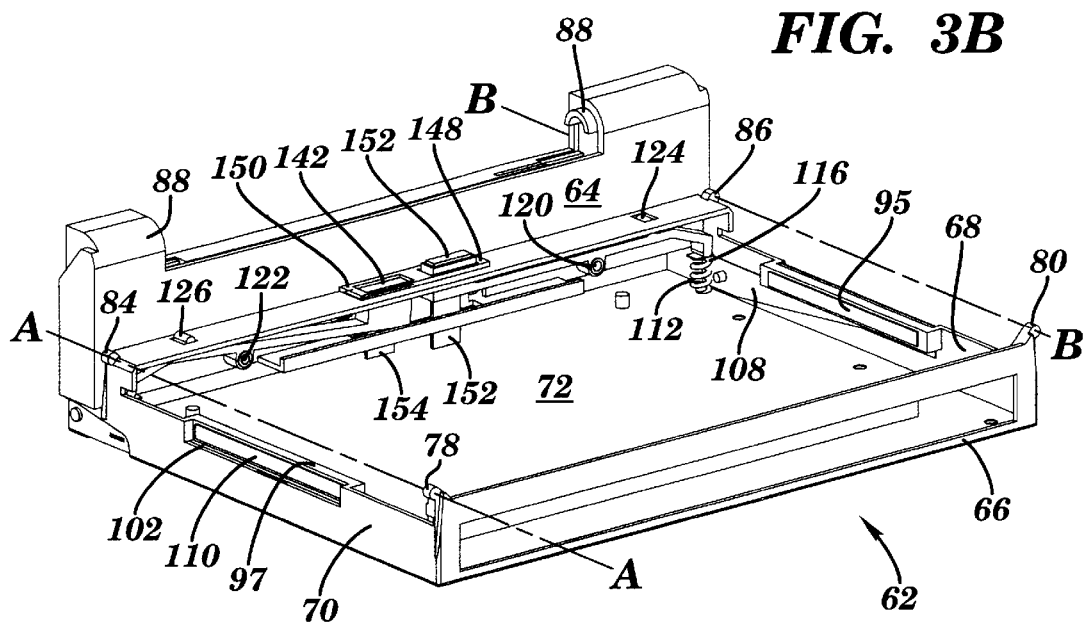
FIG. 3B is a perspective view from another side of the platform for the central keyboard assembly.
Figure 3C:
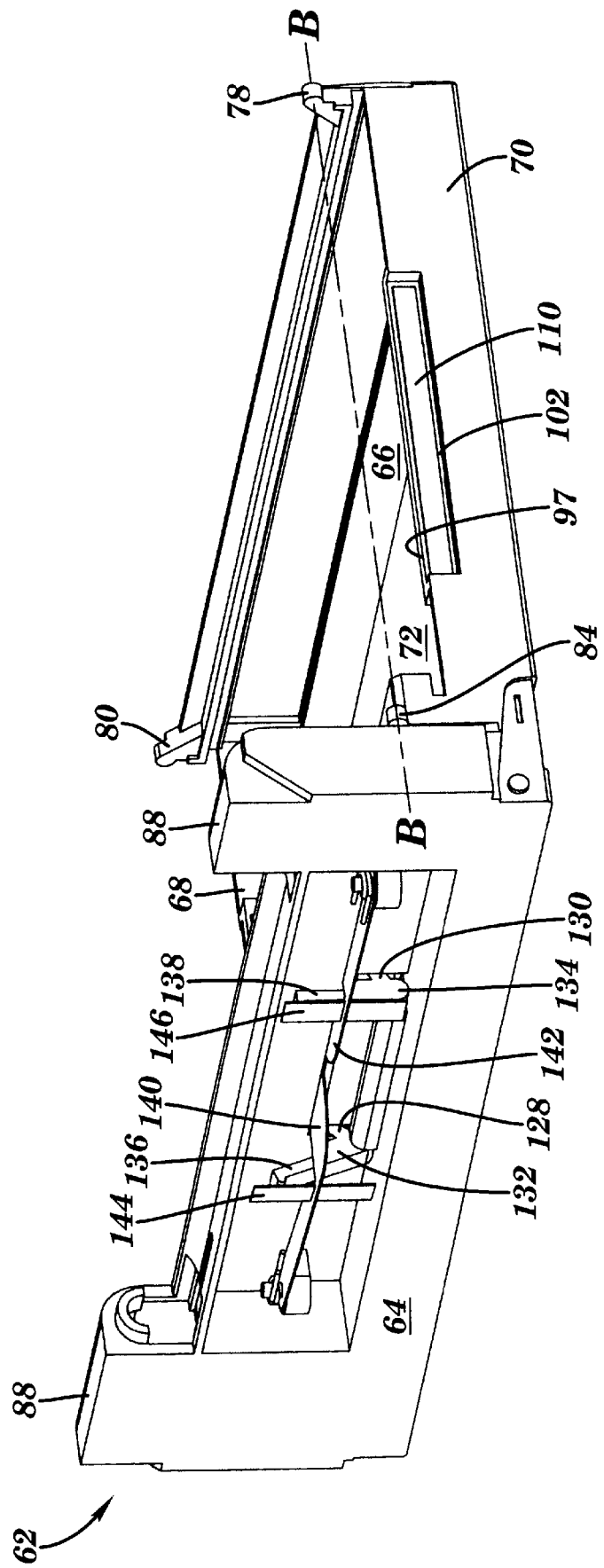
FIG. 3C is a perspective view from the back of the platform for the central keyboard assembly.
Figure 3D:
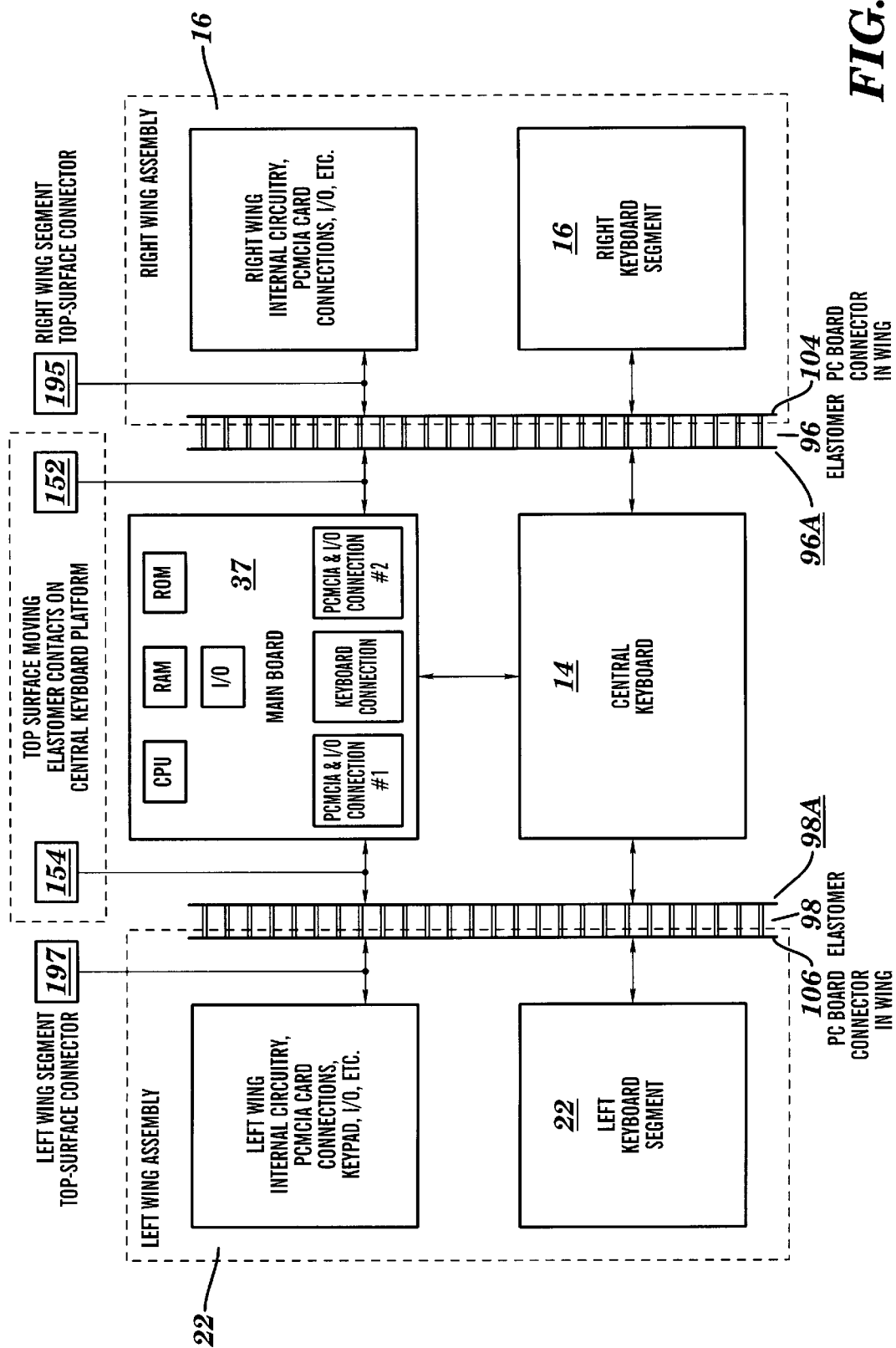
FIG. 3D is a block diagram of the keyboard interconnect, interconnect for devices installable in the keyboard wing sections, and of the circuitry for the computer.
Figure 3E:
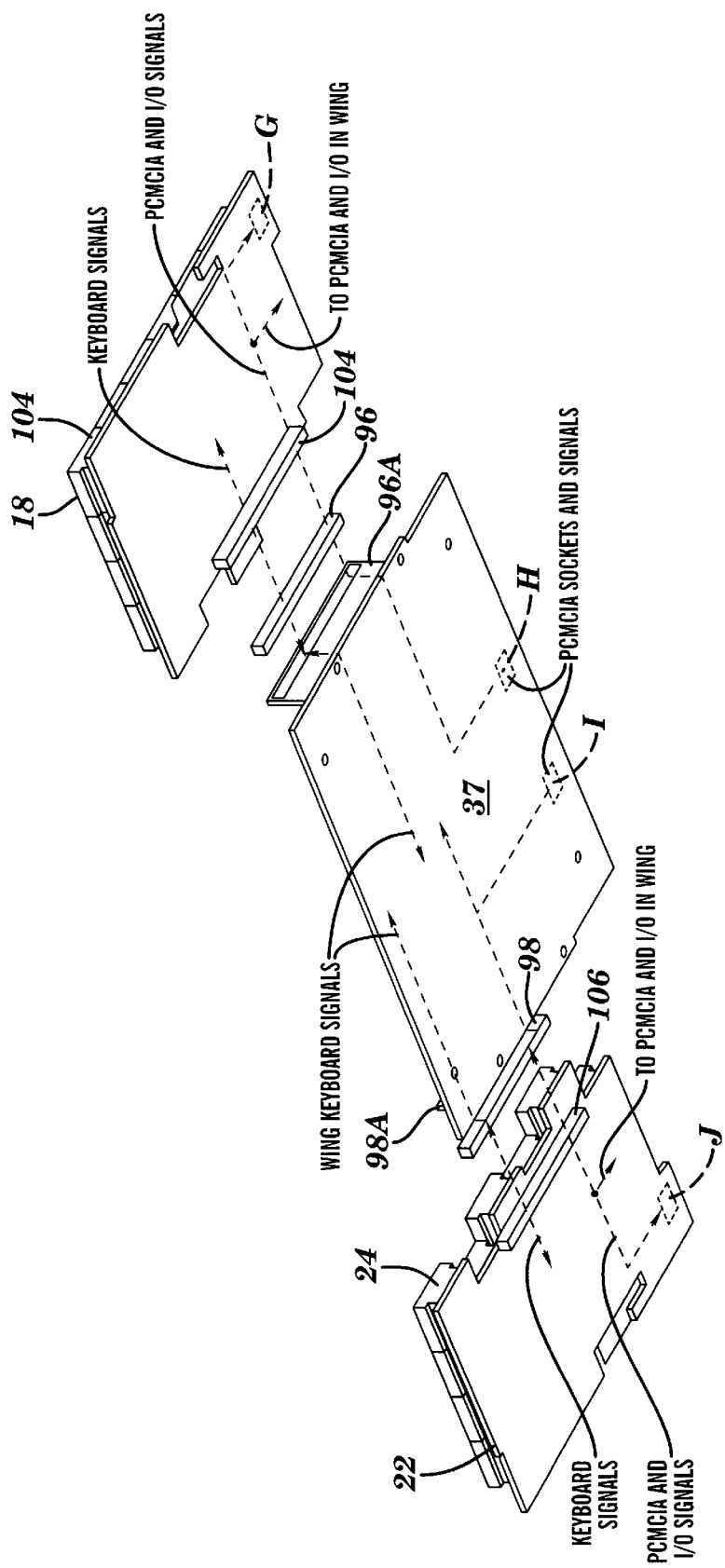
FIG. 3E is an exploded view of a portion of the central housing and right and left keyboard assemblies showing the components in the electrical interconnect between the wings and the central section.
Figure 3F:
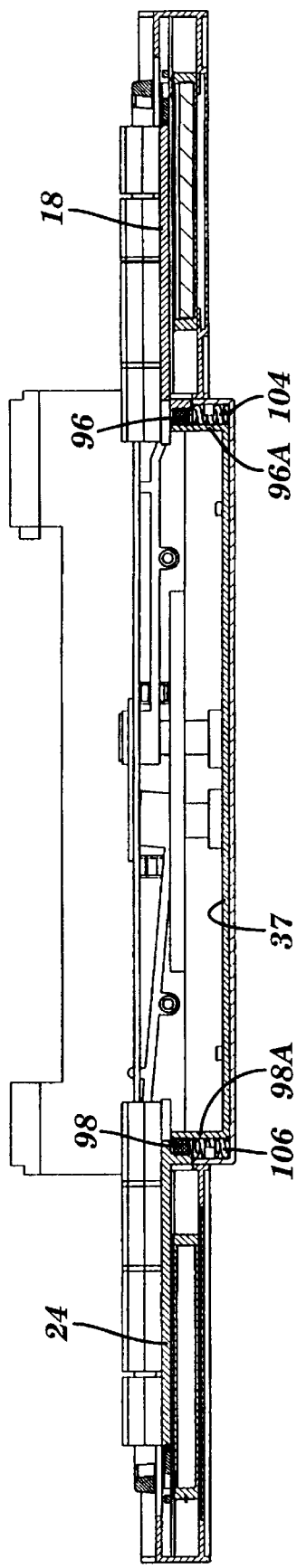
FIG. 3F is a cross-sectional view of a portion of the central, right, left keyboard assemblies showing the elements that comprise the electrical interconnect when the keyboard is in the open position (although the keyboard is in the open position, for purposes of illustration only, the top-surface interconnect on the right-hand side is shown in the closed position)
Figure 3G:
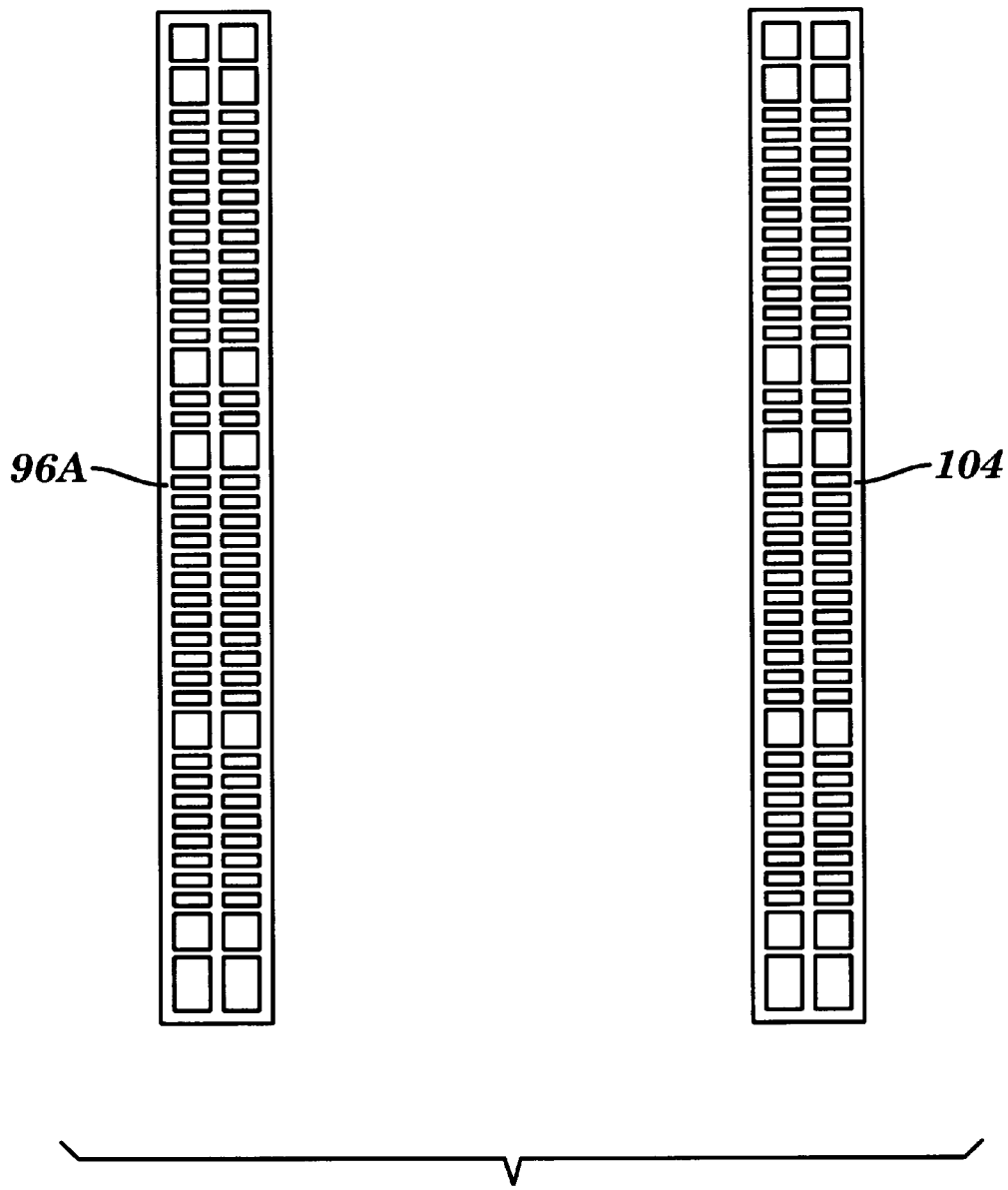
FIG. 3G is a front view of one example of the pairs of identical PC connector boards used in electrically connecting the wing to the central keyboard assembly.
Figure 4A:
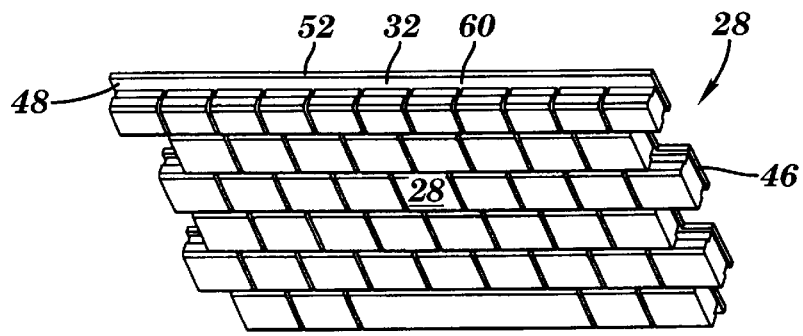
FIG. 4A is a perspective top view of a portion of the central keyboard assembly.
Figure 4B:
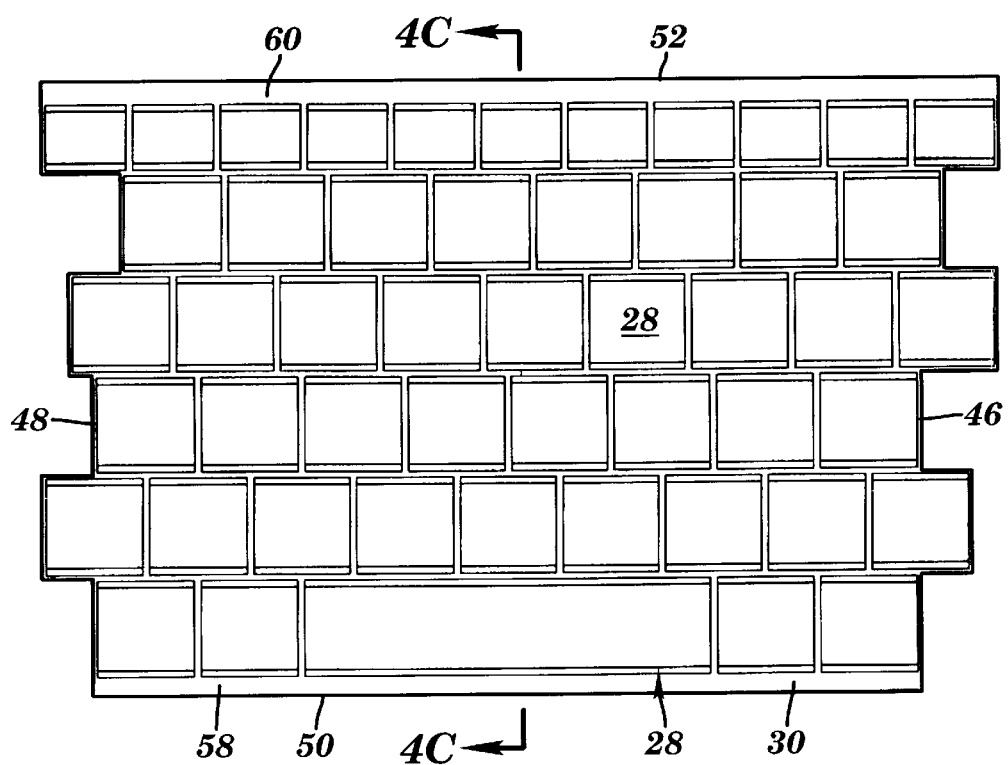
FIG. 4B is a top view of a portion of the central keyboard assembly.
Figure 4C:
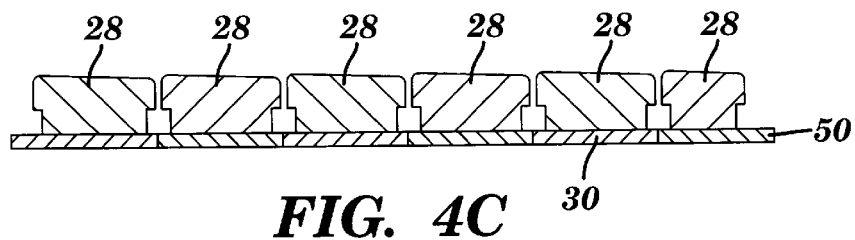
FIG. 4C is a cross-sectional view of a portions of the central keyboard assembly taken along line 4C—4C in FIG. 4B.

Referring to FIGS. 3A–3G a lip 95 for a conductive elastomer 96 is adjacent to the top of one of the opposing side walls 68 and another lip 97 for another conductive elastomer 98 is adjacent to the top of the other one of the opposing side walls 70. Perpendicular PC board connectors or strips 96A and 98A are coupled to the circuitry 37. Conductive elastomer 96 is seated on lip 95 and is electrically coupled to PC board connector 96A when under compression and conductive elastomer 98 is located on lip 97 and is electrically coupled to PC board connector 98A when under compression. As illustrated in FIG. 3G, PC board connector 96A and PC board connector 104 have a plurality of contacts, which may be allocated among the functions of connecting keyboard keys, connecting other components, and supplying power and ground. Segment 18 has a PC board connector 104 and when slid into contact with conductive elastomer 96 at the second position provides the interconnect between PC board connectors 96A and 104 in wing 20. Note that any matching pattern of contacts, tailored for the current, shielding and other requirements of each signal is possible, constrained only by the contact spacing constraints imposed by the fiber-spacing in the conductive elastomer. Similarly, the PC board connector 106 is mated with PC board connector 98A when segment 24 is slid into contact with second elastomer 98 at the second position. Each of the opposing side walls 68 and 70 has an opening 100 and 102 which exposes one end of each of the first conductive elastomers 96 and 98. The PC board connectors 96A and 98A and the conductive elastomers 96 and 98 are designed to mate with PC board connectors 104 and 106 on the right and left keyboard assemblies 16 and 22 when brought into contact with each other. Note that the straight-line travel of the segments 18 and 24 for the right and left keyboard assemblies 16 and 22 permits uniform compression of the conductive elastomers 96 and 98 by the contacting PC board connectors 104 (right) and 106 (left). Although PC board connectors and conductive elastomers are shown in this particular embodiment, any type or combination of electrical or signaling connectors can be used as needed or desired, including conventional spring contacts or pin and socket contacts, or non-contact methods such as Infra-Red (IR) or inductive coupling.

Additionally, the electrical coupling surfaces or electrical contacts could be incorporated into the edges of the keyboard bases 18 and 24, such that they mate with the edges of the central keyboard base 30. Such an approach would minimize the thickness of the keyboard in an application where PCMCIA slots or additional circuitry were not incorporated into the wing sections, making it desirable to eliminate the additional thickness incurred by placing connectors under the keyboard bases. Any of the previously described interconnect methods would be applicable, including spring contacts, pin and socket connectors or conductive elastomer, as well as non-contact methods described earlier. This approach could also be used in conjunction with PCMCIA slots or circuitry in the wing sections. In this particular embodiment, these connections would couple the keys 32 and 34, removable PCMCIA modules or fixed circuitry, and other components such as a keypad in the right and left keyboard assemblies 16 and 22 to the circuitry in the central keyboard assembly 14.

The expandable keyboard 10 may also include shutters 108 and 110 to protect the internal circuitry from electrostatic discharge, dust, dirt, and other contaminants. One elongated shutter 108 is pivotally connected along the inner surface of one of the side walls 68 and another elongated shutter 110 is pivotally connected along the inner surface of the other of the side wall 70. The elongated shutters 108 and 110 can be pivoted between positions where one end of the elongated shutters 108 and 110 either covers or exposes the ends of the first conductive elastomers 96 and 98 visible through the openings 100 and 102 formed in the opposing side walls 68 and 70. A spring 112 and 114 is connected between the floor 72 of the platform 62 and an extension 116 and 118 adjacent the other end of each of the elongated shutters 108 and 110. Although one type of shutter and assembly is illustrated, other types of shutters and assemblies can also be used as needed or desired. Note that FIG. 3A shows the left shutter 110 in the keyboard-open position, and the right shutter 108 in the keyboard-closed position.

A lever 120 is pivotally connected to the inner surface of the back wall 64, adjacent one of side of the back wall 64, and below the top strip 82 with one end of the lever 120 resting on top of the extension 116 of one of the elongated shutters 108 over the spring 112. Another lever 122 is pivotally connected to the inner surface of the back wall 64, adjacent the other side of the back wall 64, and below the top strip 82 with one end of the lever 122 resting on top of the extension 116 of the other elongated shutter 110 over the spring 112. The top strip 82 has a pair of openings 124 and 126 which provide access for projections on the right and left keyboard assemblies 16 and 22 to projections 124 and 126 near the end of each of the levers 120 and 122.

Referring to FIGS. 1C, 1D, 2A–2C and 3A–3C, the other ends of each lever 120 and 122 are each located below the shorter extension 128 and 130 of a J-shaped structure 132 and 134 located in the back wall 64 of the platform 62. The base of each of the J-shaped structures 132 and 134 is pivotally connected in the back wall 64 of the platform 62. The back surface of each of the longer extensions 136 and 138 of each of the J-shaped structures 132 and 134 are seated against the an inner edge of a flat, J-shaped shutter 140 and 142. As shown in FIG. 3C, one end of each flat, J-shaped shutter 140 and 142 is pivotally connected to the back wall 64 of the platform 62. Each flat, J-shaped shutter 140 and 142 also has a flat biasing projection 144 and 146 which is secured to the back wall 64 and to the flat, J-shaped shutter 140 and 142. The top strip 82 includes another set of openings 148 and 150 adjacent the center of the top strip 82.

Elastomeric electrical connectors and their corresponding flexible ribbon cables 152 and 154 are connected to the other ends of each lever 120 and 122 and are located in each of these openings 148 and 150. Each of the electrical connectors 152 and 154 is coupled to the circuitry 37 via the flexible ribbon cable. The other end of each lever 120 and 122 can move the electrical connectors 152 and 154 to a position above the openings 148 and 150 and into electrical contact with connectors 195 and 197 on right and left keyboard assemblies 16 and 22 when the right and left keyboard assembly 16 and 22 are in a closed position folded in on the central keyboard assembly 14. The other end of each lever 120 and 122 can move the electrical connectors 152 and 154 to a position below the openings 148 and 150 and disconnect it from connectors 195 and 197 when the right and left keyboard assembly 16 and 22 are in an open position folded out from the central keyboard assembly. In this open position, shutters 140 and 142 are biased into a position covering openings 148 and 150 by springs 112 and 114.

Referring to FIGS. 3D, 5C, 5E, 6C, and 6E, first wing 20 includes a window 191 and second wing 26 includes a window 193. An electrical connector 195 is located on segment 18 and an electrical connector 197 is located on segment 24. Electrical connectors 195 and 197 are coupled to the same components that the lower half of PC board connectors 104 and 106 are coupled to, with the exception of the wing segment keyboard keys, which are not operable and thus are not used in the closed position. When segment 18 is slid to a second position to connect the right keyboard assembly 16 with the central keyboard assembly 14, the connector 195 is slid out of the window 191. In this position, the connector 195 is protected from environmental and ESD damage when the keyboard is in the open and operating position. When the segment 18 is slid back away from the central keyboard assembly, the connector 195 is positioned in window 191. When wing 20 is folded over on to the central keyboard assembly, electrical connector 195 is coupled to electrical connector 152. Similarly, when segment 24 is moved towards central keyboard assembly 14, connector 197 is moved out of window 193. When segment 24 is moved away from central keyboard assembly 14, connector 197 is positioned in window 193. When wing 26 is folded in on central keyboard assembly 14, electrical connector 197 is coupled to electrical connector 154.

The other end of each flat, J-shaped shutter 140 and 142 is biased by the biasing projections 144 and 146 to cover the openings 148 and 150. Each of the flat, J-shaped shutters 140 and 142 can be moved to a position covering the openings 148 and 150 when the right and left keyboard assemblies 16 and 22 are in an open position folded out from the central keyboard assembly 14 and to a position exposing the openings 148 and 150 when the right and left keyboard assemblies 16 and 22 are in a closed position folded in on the central keyboard assembly 14. Again, although one type of shutter and assembly is illustrated, other types of shutters and assemblies can be used as needed or desired.

Referring to 1B–1E, 3D, 5A–5H, and 6A–6H the right and left keyboard assemblies 16 and 22 are illustrated. The right keyboard assembly 16 includes the first segment 18 and the first wing 20 and the left keyboard assembly 22 includes the second segment 24 and the second wing 26. Segment 18 is a keyboard base and includes opposing side edges 54 and 156, front edge 160, back edge 164, and top surface 168. Segment 24 is another keyboard-base and includes opposing side edges 56 and 158, front edge 162, back edge 166, and top surface 170. In this particular embodiment, a plurality of keys 32 are connected to the top surface 168 of segment 18 and a plurality of keys 34 are connected to the top surface 178 of segment 24. These keys 32 and 34 comprise the remainder of the keys found on the right and left sides of a standard size keyboard, although each segment 18 and 24 could incorporate other components, such as a microphone, speaker or internal circuitry.

One side edge 54 of the segment 18 for the right keyboard assembly 16 is designed to mate with one side edge 46 of the keyboard-base 30 in the central keyboard assembly 14. Similarly, one side edge 56 of the segment 24 for the left keyboard assembly 22 is designed to mate with one side edge 48 of the keyboard-base 30 in the central keyboard assembly 14. The other side edge 156 of the segment 18 for the right keyboard assembly 16 has a slot 172 which fits around a shaft 176 of a lever 180 used in this particular embodiment to move the segment 18 to the first position, second position, and other positions. Similarly, the other side edge 158 of the segment 24 for the left keyboard assembly 22 has a slot 174 which fits around a shaft 178 of a lever 182 used in this particular embodiment to move segment 24 to the first position, second position, and other positions.

Each key 32 or 34 on the right or left keyboard assemblies 16 and 22 is substantially the same size as a key found on a standard keyboard and is normally held in a raised position above the segment 18 or 24 by a biasing device (not shown) connected between the keyboard-base 18 or 24 and each key 32 or 34. Each of the key tops is normally held in substantially the same plane. When a key 18 or 24 is depressed, the key 18 or 24 completes a connection which is coupled to a PC board connector 104 or 106. The manners in which the keys and component are coupled in this embodiment are shown in FIG. 3D. Again, although one type of key is shown, other types of keys, such as dome switch, membrane or any combination, with or without rigid keycaps, can be used as needed or desired.

The wing 20 of the right keyboard assembly 16 has a front wall 184, back wall 188 and side wall 192 that are connected together to form a substantially U-shaped structure in this particular embodiment. Similarly, wing 26 of the left keyboard assembly 22 has a front wall 186, back wall 190, and side wall 194 that are connected together to form a substantially U-shaped structure in this particular embodiment. Part 196 of a pivotal connection is located adjacent one top corner of the front wall 184 opposite from the side wall and another part 198 of a pivotal connection is located adjacent one top corner of the back wall 188 opposite from the side wall 192. Each of these parts 196 and 198 of the pivotal connection comprise a tab which extends out from the top corner of the front wall 184 and the top corner of the back wall 188 and has an opening to receive a pivot pin. The openings in the parts 80 and 86 are aligned with the openings in parts 196 and 198 and the pivot pins are inserted and secured to pivotally connect the right keyboard assembly 16 to the central keyboard assembly 14 to pivot about the axis B-B. Similarly, the openings in the parts 78 and 84 are aligned with the openings in parts 200 and 202 and the pivot pins are inserted to pivotally connect the left keyboard assembly 22 to the central keyboard assembly 14 to pivot about the axis A-A. Again, although one type of pivotal connection is disclosed, other types of pivoting structures can also be used as needed or desired.

The wing 20 for the right keyboard assembly 16 includes a projection 252 on back wall 188 which is designed to fit in opening 124 in top strip 82 to engage one end of lever 120 when right keyboard assembly 16 is in a closed position. The wing 26 for the left keyboard assembly 22 includes a projection 254 on back wall 190 which is designed to fit in opening 126 in top strip 82 to engage one end of lever 122 when left keyboard assembly 22 is in a closed position.

The wings 20 and 26 for the right and left keyboard assemblies 16 and 22 also each include a bottom structure 204 and 206 which can incorporate other components, such as a keypad of numbers for a telephone, internal circuitry, a slot for electronic cards such as PCMCIA or smart cards, a speaker, and/or a microphone, as needed or desired. The components on the right keyboard assembly 16 are coupled to PC board connector 104 and the electrical connector 195 and the components on the left keyboard assembly are coupled to PC board connector 106 and to electrical connector 197. In this particular embodiment, the bottom structure 204 of the wing 20 for the right keyboard assembly 16 has a slot 208 for electronic cards, and the bottom structure 206 for the left keyboard assembly has a keypad 210 of numbers for a telephone and another card slot 212. When the wings 20 and 26 for the right and left keyboard assemblies 16 and 22 are folded in onto the central keyboard assembly 14, the slots 208 and 212 for electronic cards and the keypad 210 of numbers for a telephone are coupled to circuitry 37 in the electronic product via connectors 150, 152, 195, and 197. When the wings 20 and 26 for the right and left keyboard assemblies 16 and 22 are folded out, the slots 208 and 212 for electronic cards and the keypad 210 of numbers for a telephone are connected via PC boards 96A, 98A, 104, and 106 and conductive elastomers 96 and 98.

A track 218 and 216 is formed along the inner surface of the front wall 184 of the wing 20 for the right hand keyboard assembly 16 and a track 220 is formed along the inner surface of the front wall 186 of the wing 26 for the left keyboard assembly 22. Another track 214 and 220 is formed along the inner surface of the back wall 188 of the wing 20 for the right keyboard assembly 16, and a track 216 is formed along the inner surface of the back wall 190 of the wing 26 the left keyboard assembly 22. The lip 222 which extends out past the front row of keys on segment 18 for the right keyboard assembly 16 which is seated in track 218 in the front wall, and the lip 224 which extends out past the front edge of the front row of keys on the segment 24 for the left keyboard assembly 22 is seated in the track 220 in the front wall. The lip 226 which extends out past the back row of keys on the segment 18 for the right keyboard assembly 16 is seated in track 214 and the lip 228 which extends out past the back row of keys on the segment 24 for the left keyboard assembly 22 is seated in track 216.

Each segment 18 and 24 is moveable along the tracks 214 and 218 or 216 and 220 to a first position which exposes axis A-A and axis B-B, permitting each wing 20 and 26 to pivot with respect to the platform 62 about axis A-A and axis B-B, and disconnecting the PC boards 96A and 98A and conductive elastomers 96 and 98 from the PC boards 104 and 106. Each segment 18 and 24 is also moveable to a second position which covers axis A-A and axis B-B, substantially preventing each wing 20 and 26 from pivoting with respect to the platform 62 about axis A-A and axis B-B, and electrically coupling the PC board connectors 96A and 98 and conductive elastomers 96 and 98 to the PC board connectors 104 and 106. Bringing the PC board connectors 104 and 106 in electrical contact with the conductive elastomers 96 and 98 along a straight path, rather than an arc, insures a reliable connection each time because the connecting surface is compressed uniformly over its extent. Although this embodiment shows a conductive elastomer used in combination with PC board connectors, the straight-line path connector mating permits a variety of interconnect means, such as spring contacts or pin and socket connectors, as well as non-contact methods to be used, as previously noted. In the second position, each segments 18 and 24 effectively locks the wings 20 and 26 in place in an extended position to provide a sturdy and durable keyboard. Although only a first and second position for the segments 18 and 24 for the right and left keyboard assemblies 16 and 22 are discussed, the segments 18 and 24 can be slid to other positions in the tracks during the process of opening and closing.

Figure 5A:
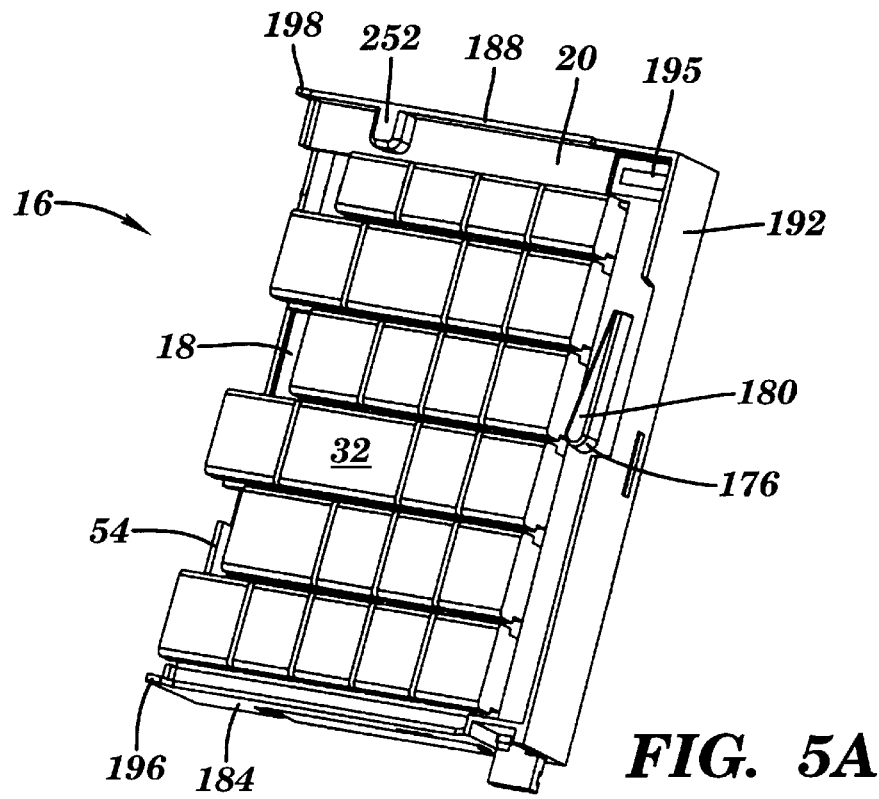
FIG. 5A is a top perspective view of the right keyboard assembly.
Figure 5B:
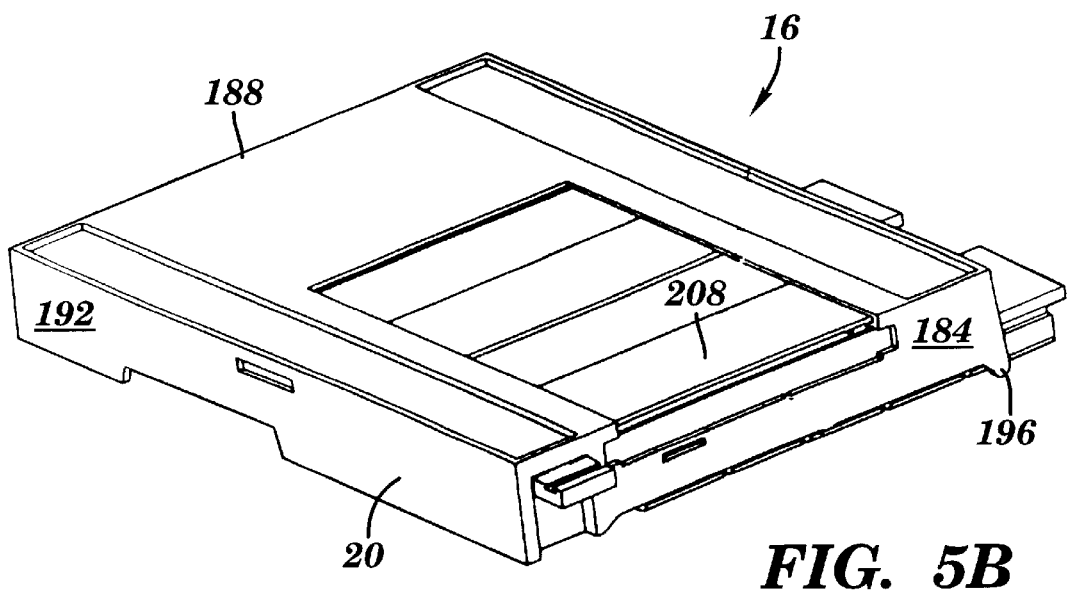
FIG. 5B is a bottom perspective view of the right keyboard assembly.
Figure 5C:
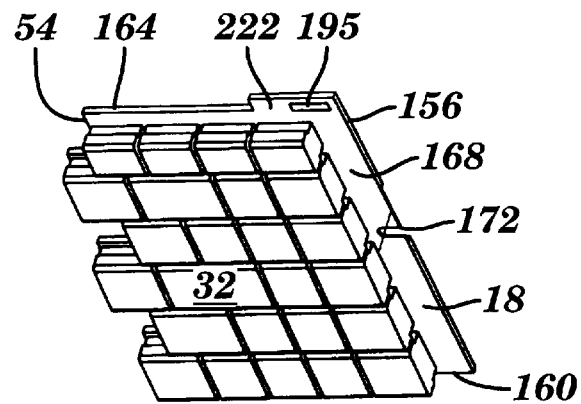
FIG. 5C is a top view of the keyboard-base for the right keyboard assembly with a plurality of keys.
Figure 5D:
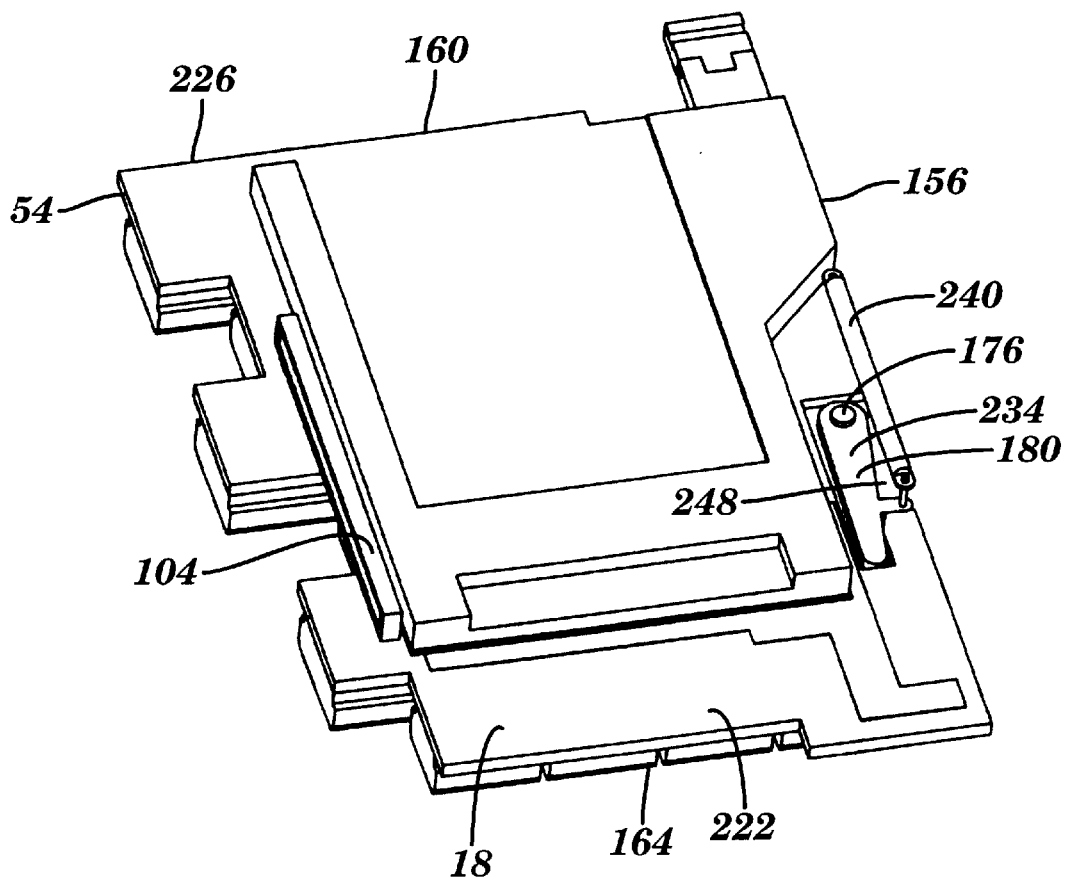
FIG. 5D is a bottom perspective view of the right keyboard assembly with a bottom cover removed.
Figure 5E:
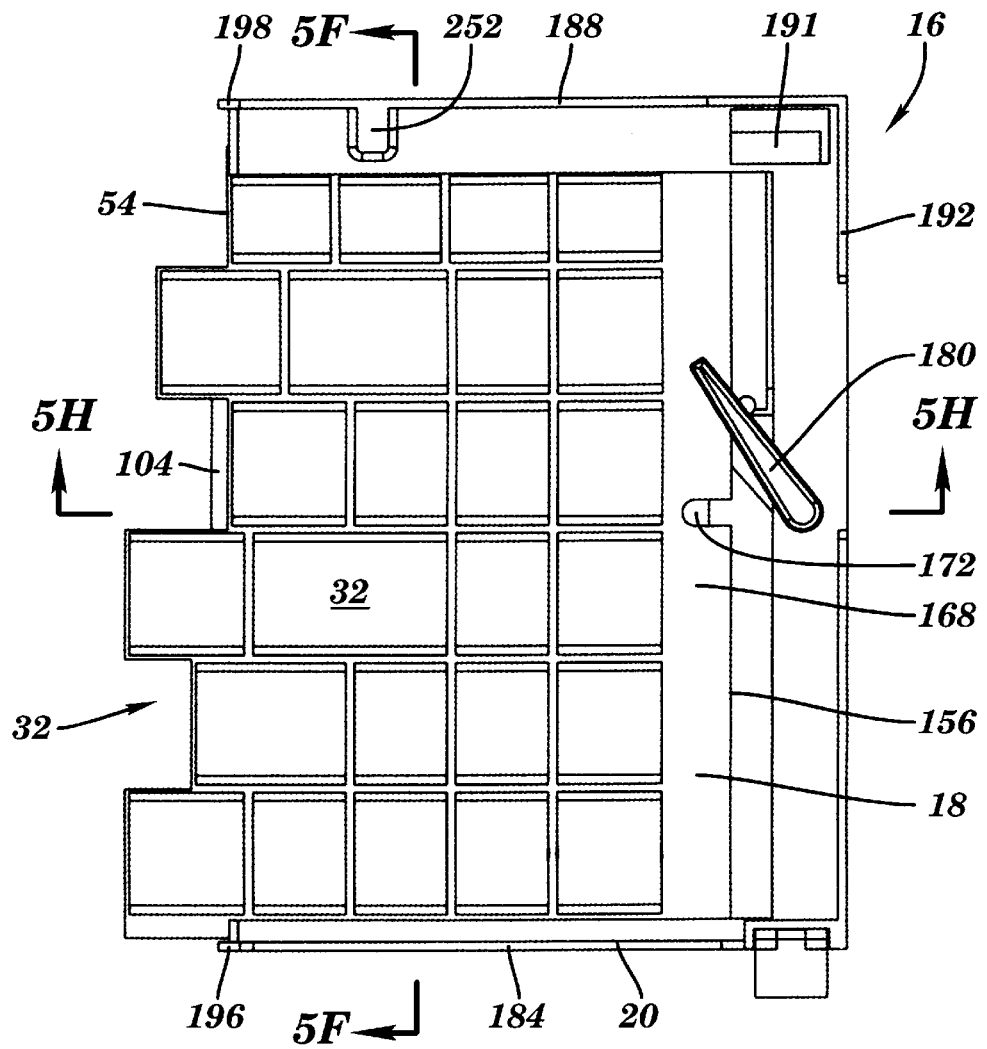
FIG. 5E is a top view of the right keyboard assembly.
Figure 5F:
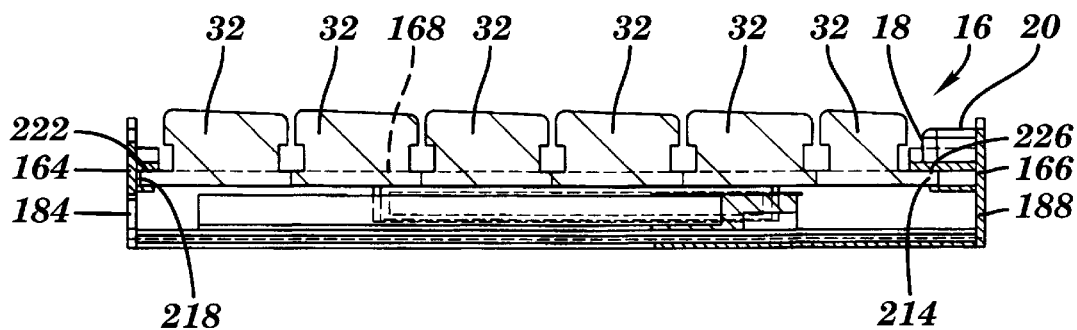
FIG. 5F is a cross-sectional view of the right keyboard assembly taken along line 5F—5F in FIG. 5E.
Figure 5G:
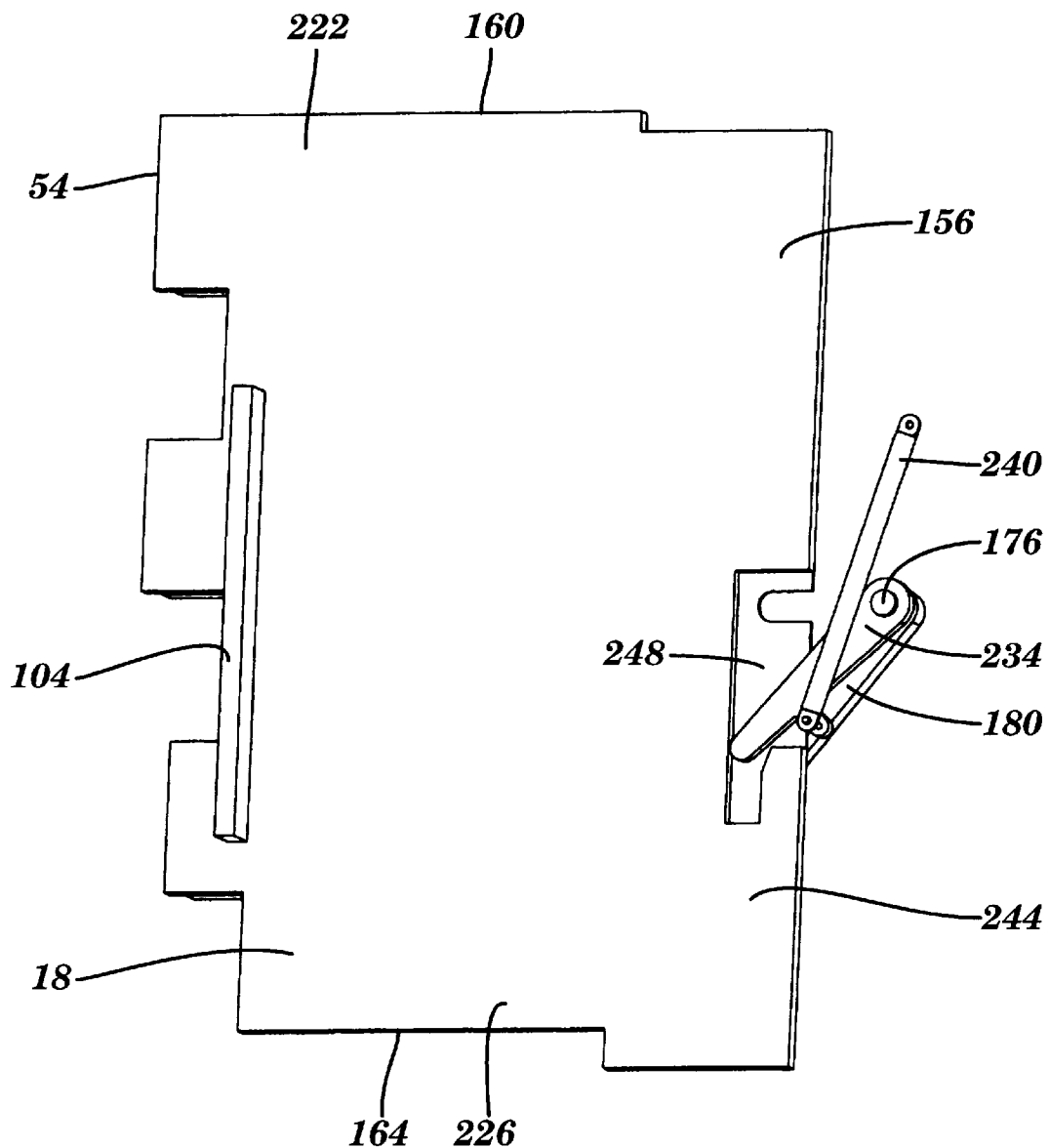
FIG. 5G is a partial bottom view of the keyboard-base and the actuating device for right keyboard assembly in the second position.
Figure 5H:
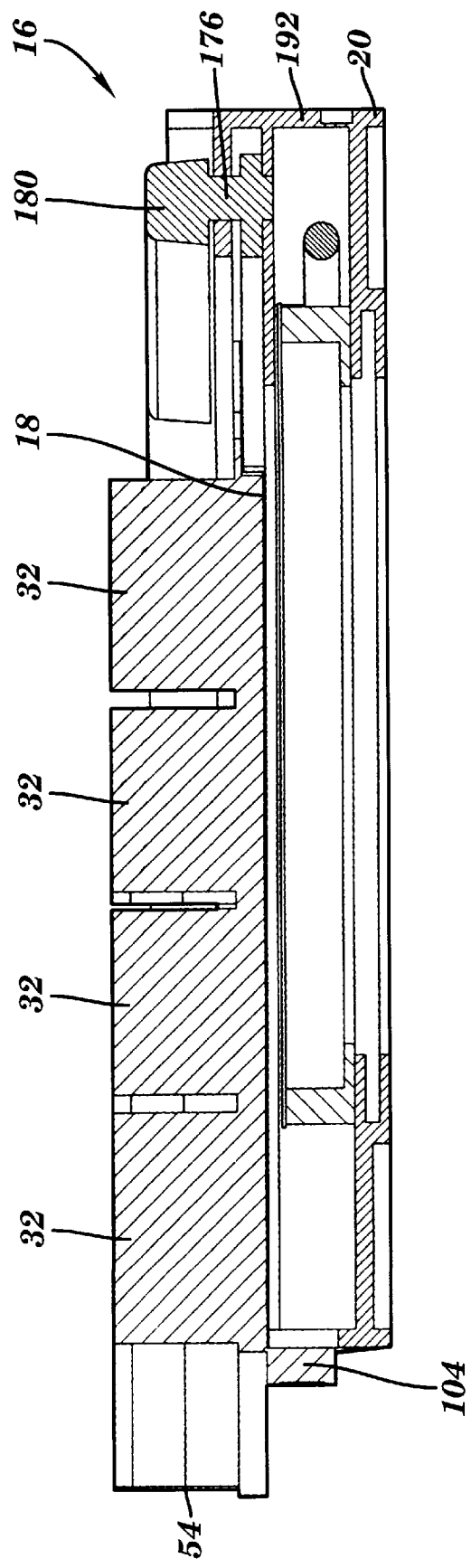
FIG. 5H is a cross-sectional view of the right keyboard assembly taken along line 5H—5H in FIG. 5E.
Figure 6A:
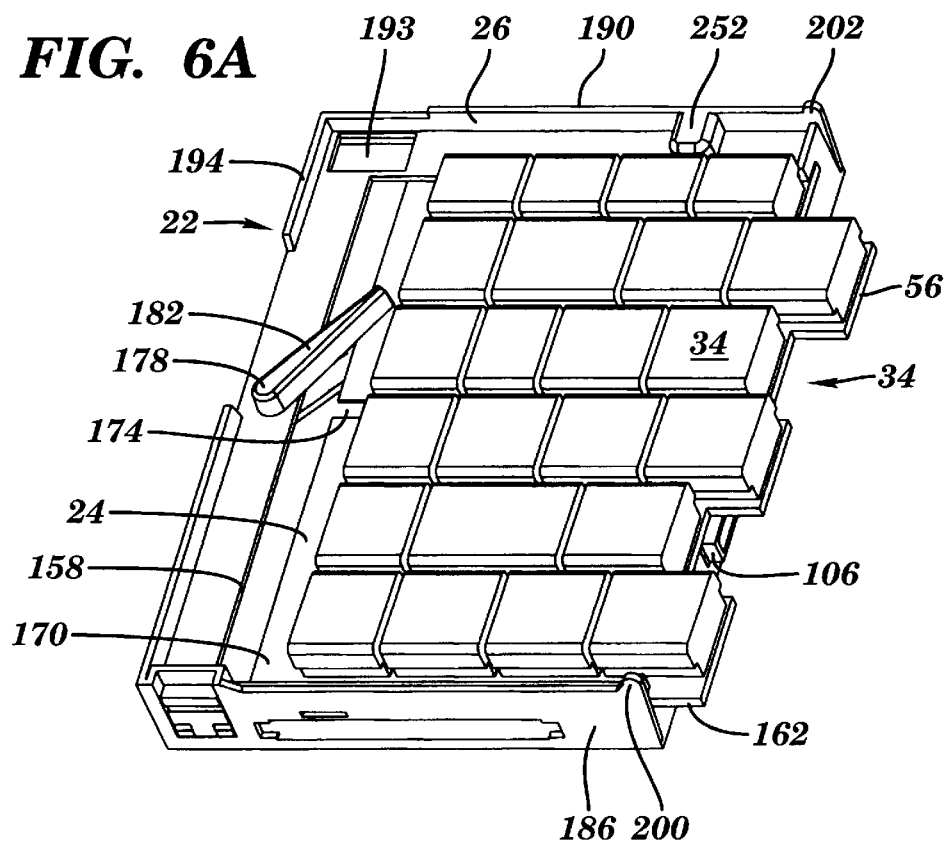
FIG. 6A is a top perspective view of the left keyboard assembly.
Figure 6B:
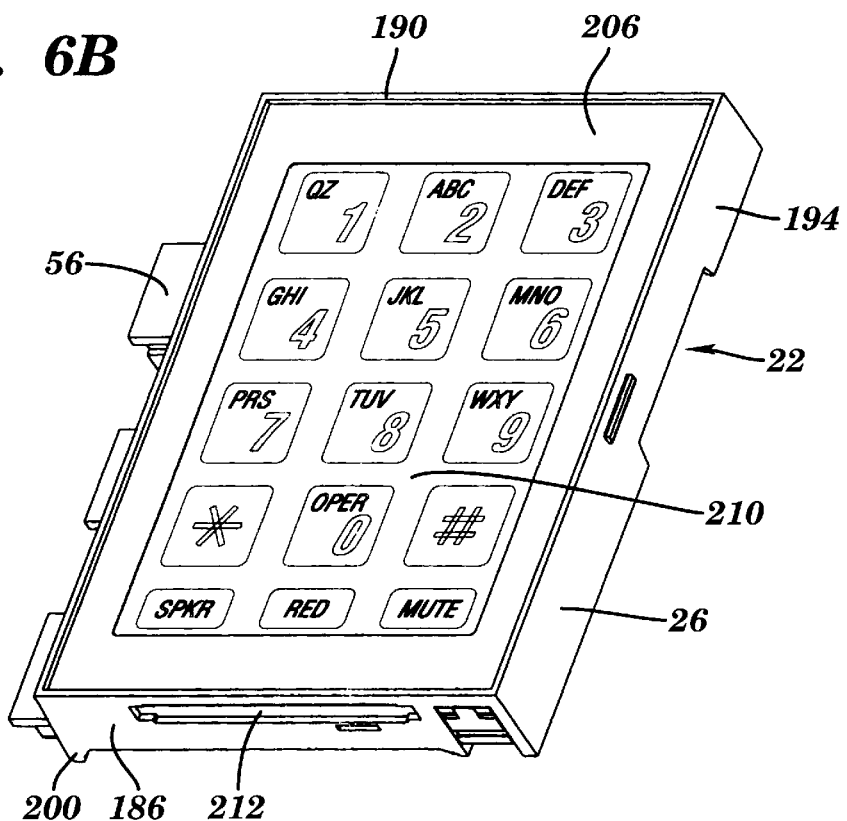
FIG. 6B is a bottom perspective view of the left keyboard assembly.
Figure 6C:
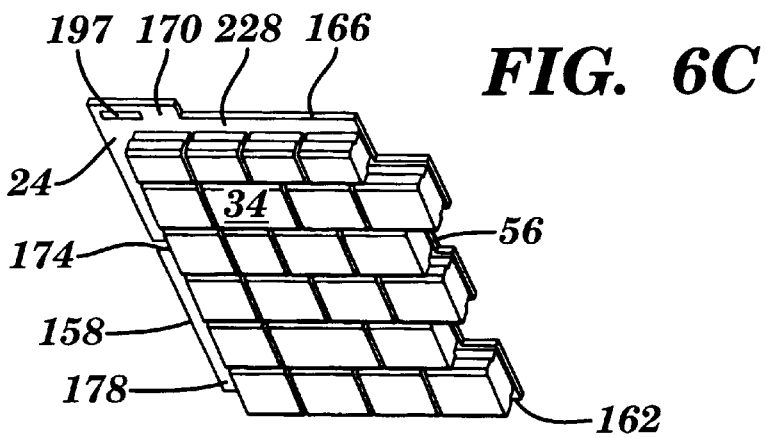
FIG. 6C is a top view of the keyboard-base for the left keyboard assembly with a plurality of keys.
Figure 6D:
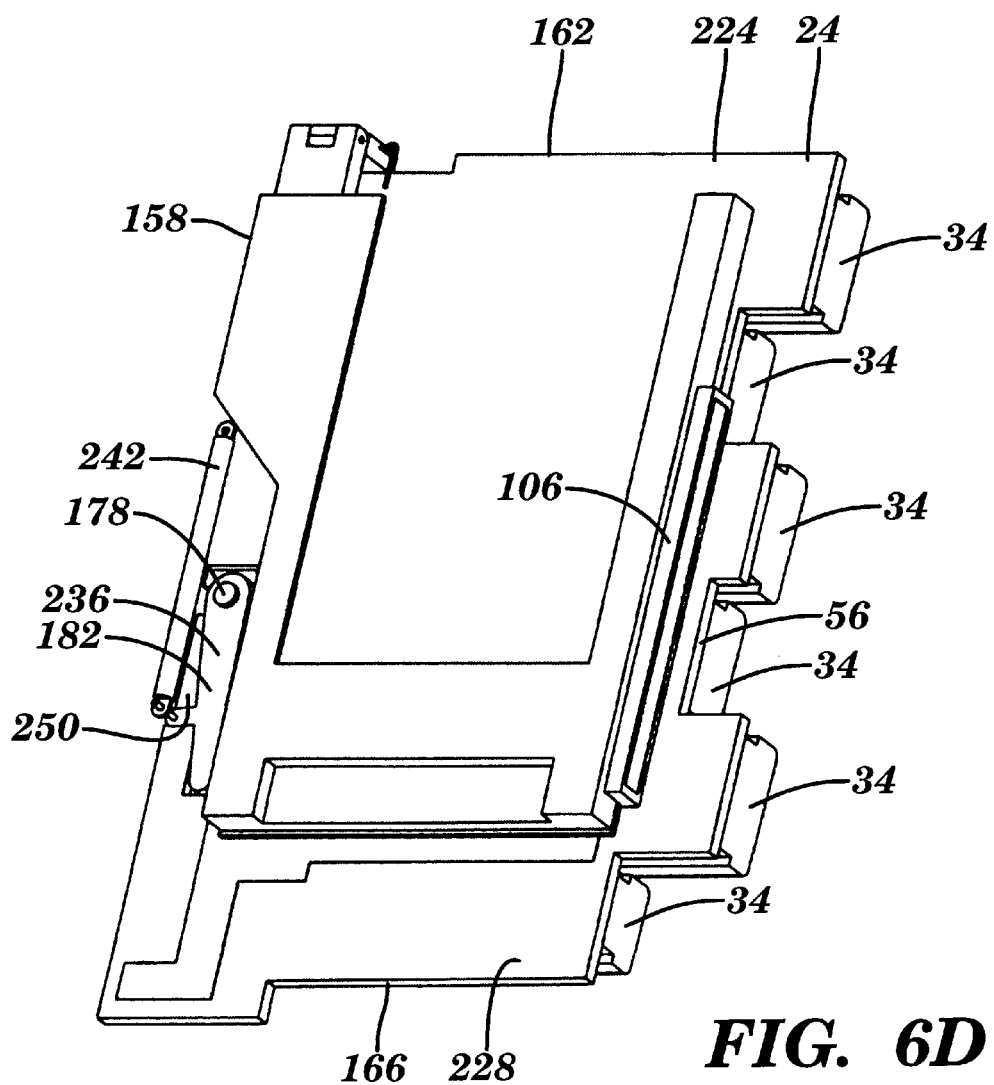
FIG. 6D is a bottom perspective view of the left keyboard assembly with a bottom cover removed.
Figure 6E:
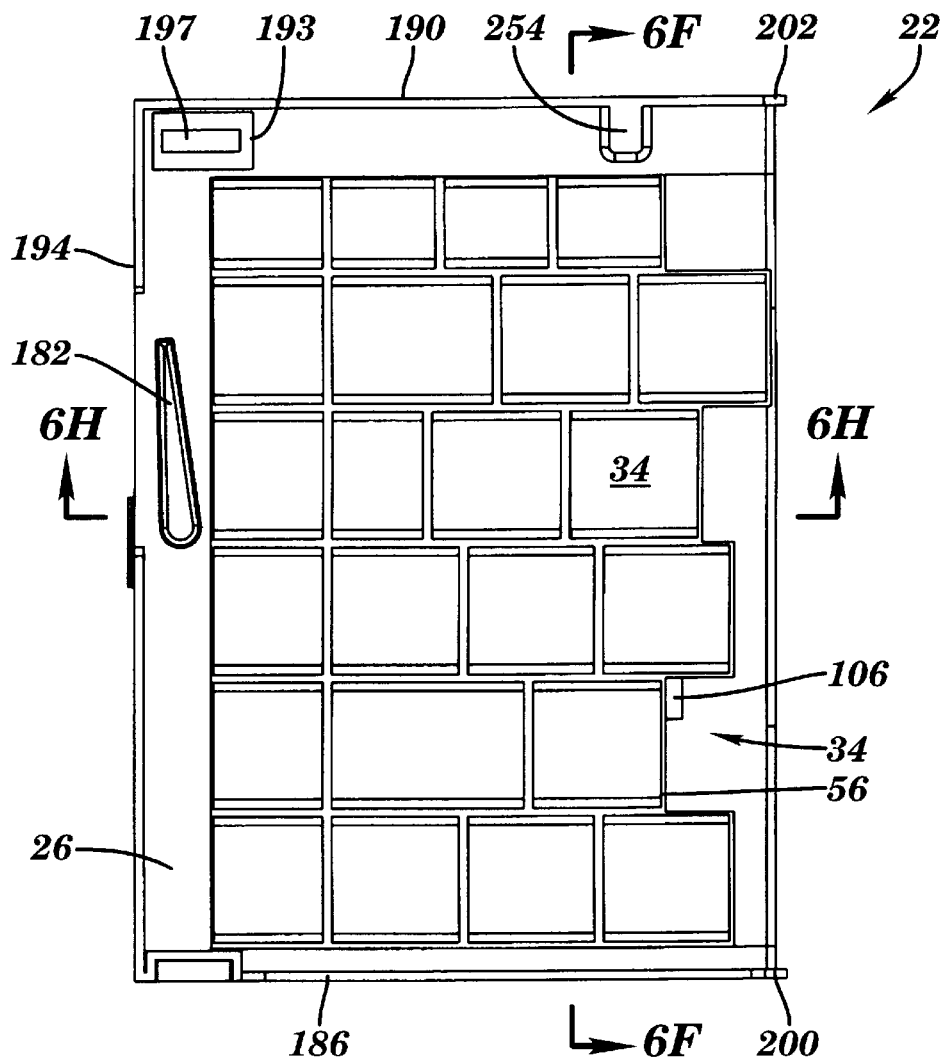
FIG. 6E is a top view of the left keyboard assembly.
Figure 6F:
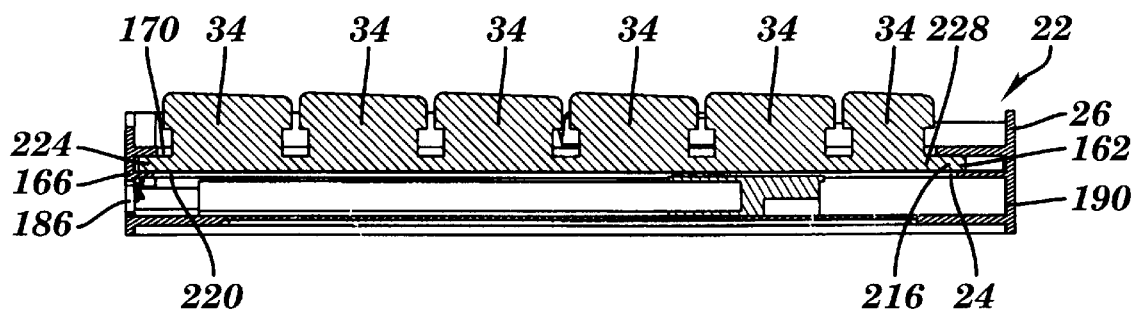
FIG. 6F is a cross-sectional view of the left keyboard assembly taken along line 6F—6F in FIG. 6E.
Figure 6G:
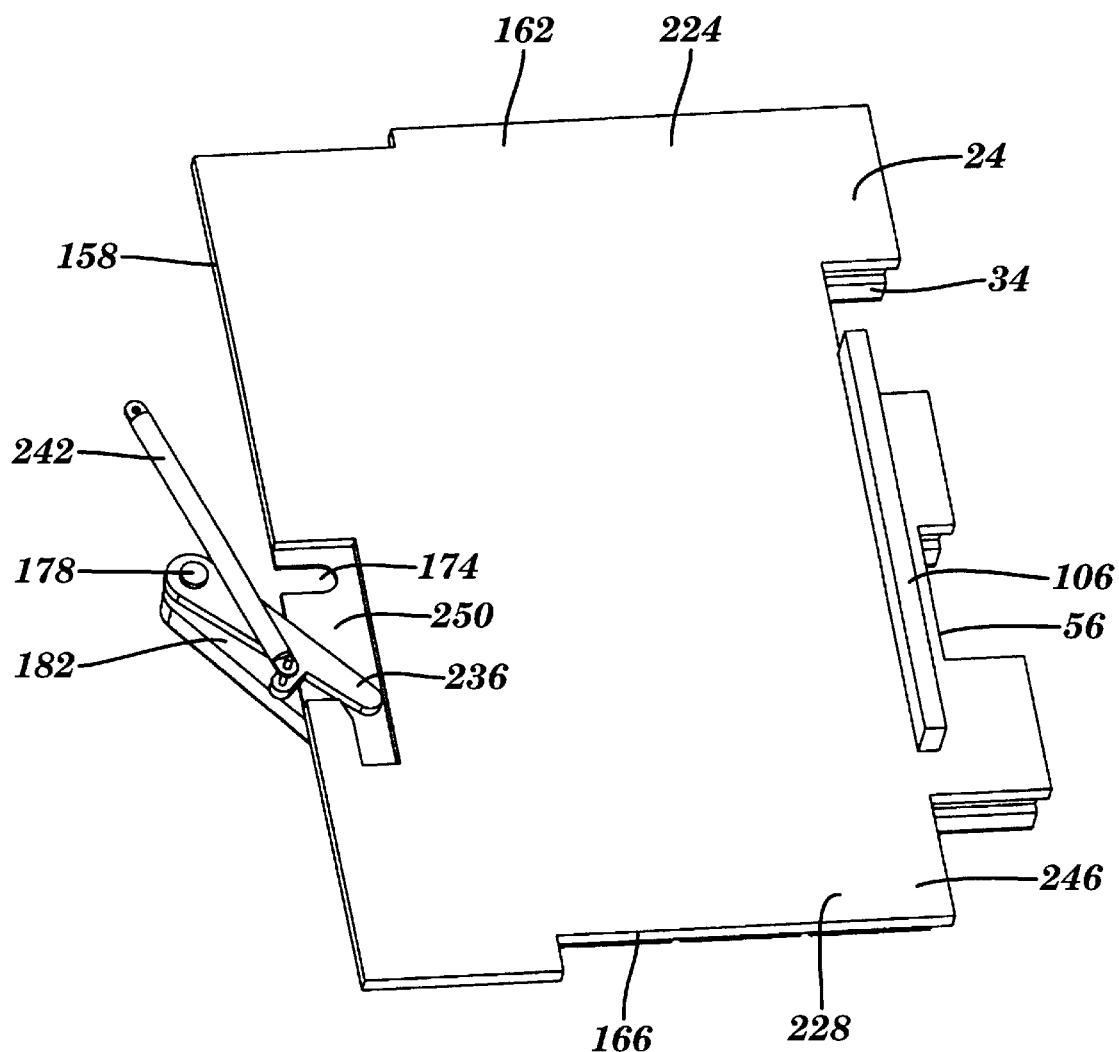
FIG. 6G is a partial bottom view of the keyboard-base and actuating device for the left keyboard.
Figure 6H:
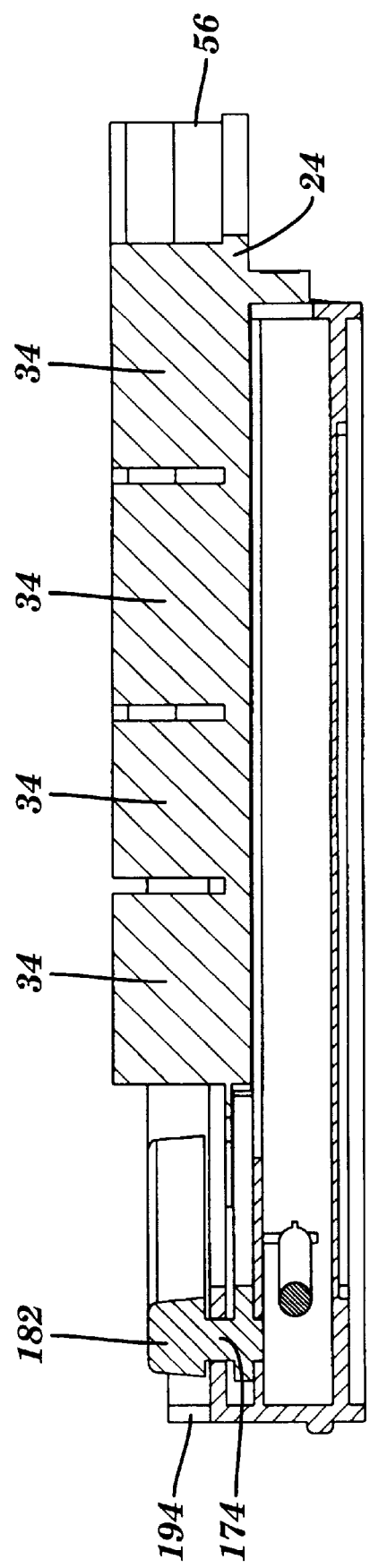
FIG. 6H is a cross-sectional view of the left keyboard assembly taken along line 6H—6H in FIG. 6E.
Figure 7A:
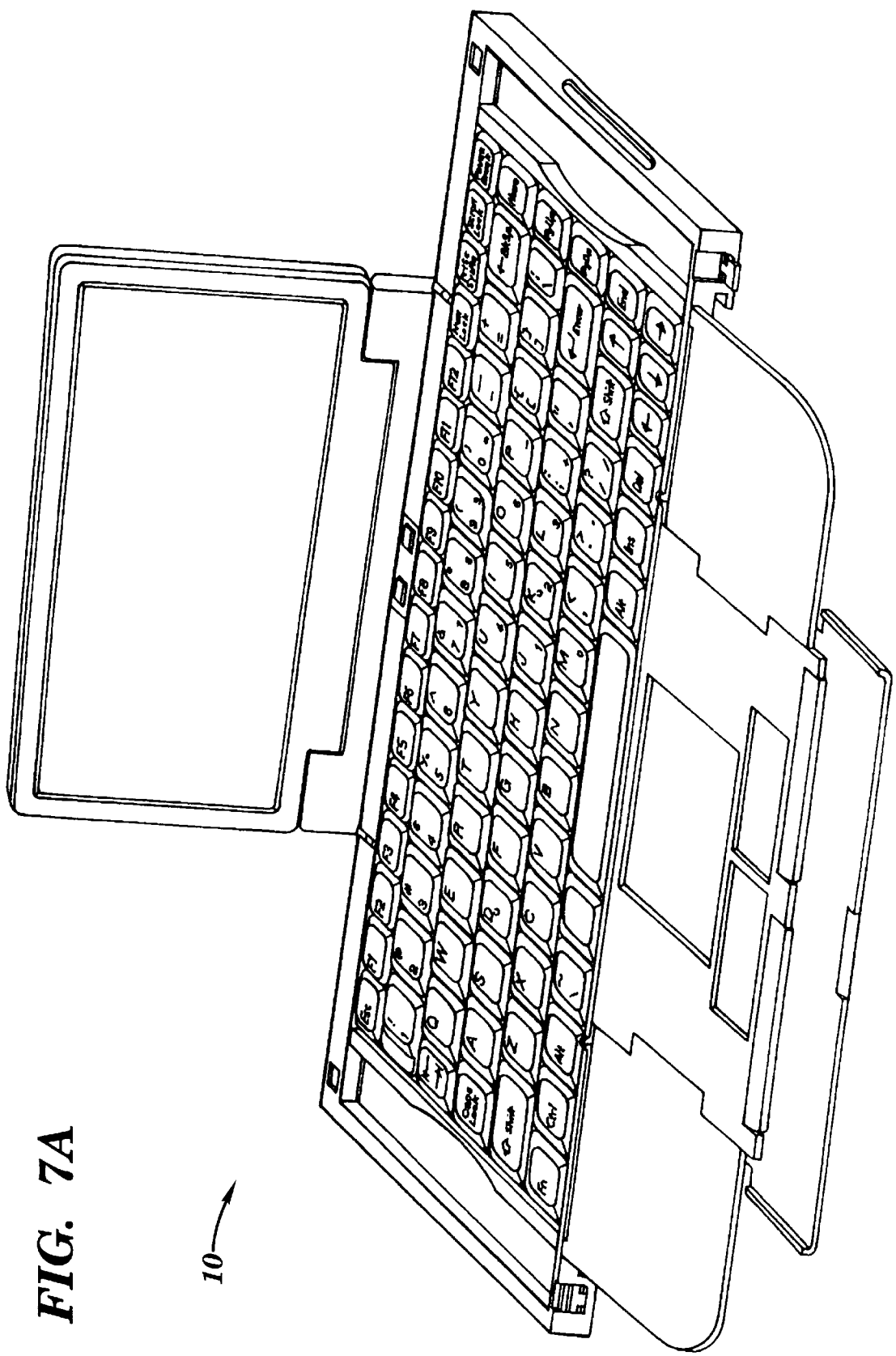
FIG. 7A is a front perspective view of another embodiment of the expandable keyboard in accordance with the present invention in a sub-notebook computer.
Figure 7B:
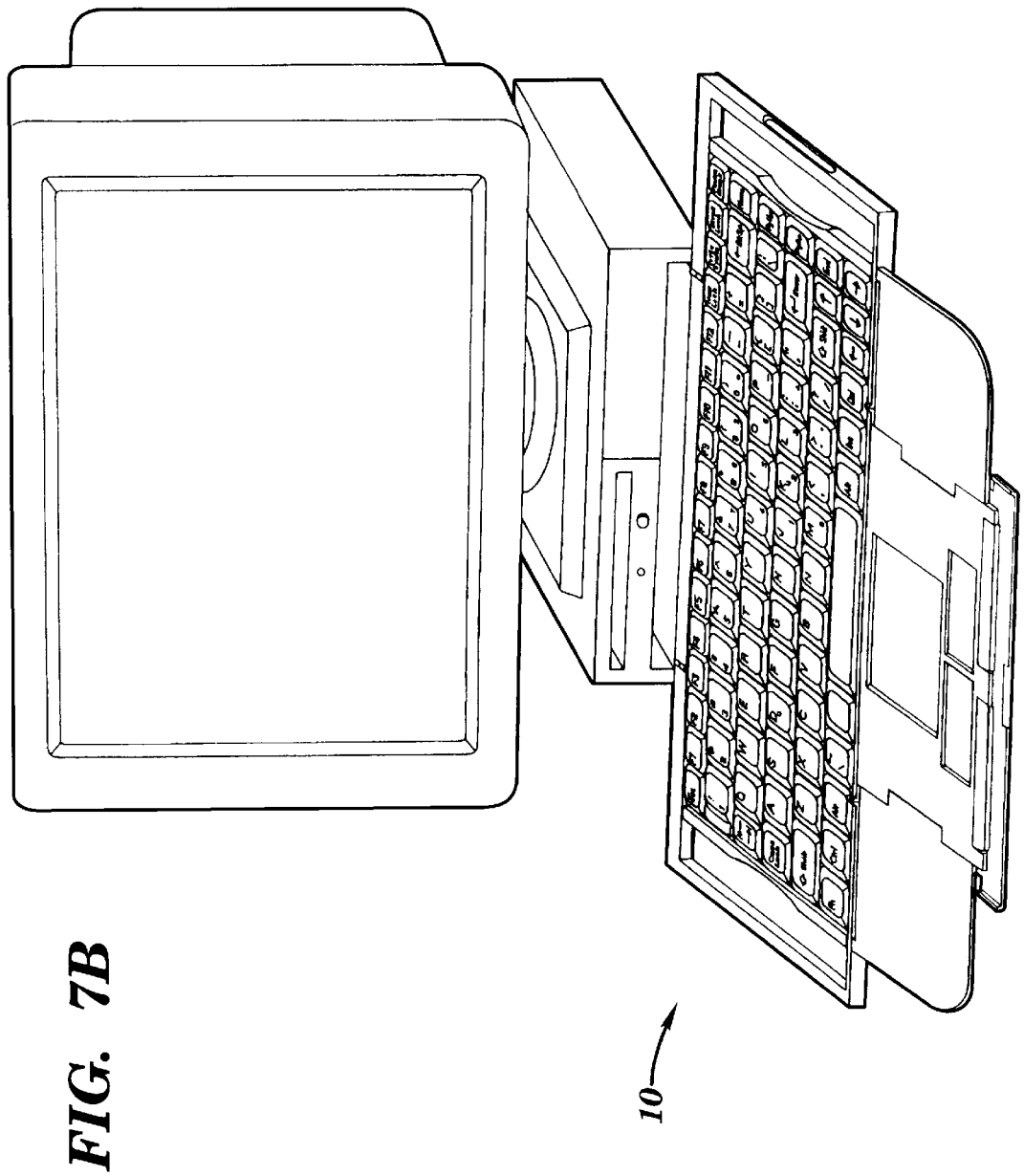
FIG. 7B is a front perspective view of another embodiment of the expandable keyboard in accordance with the present invention in a small desktop computer.
Figure 7C:
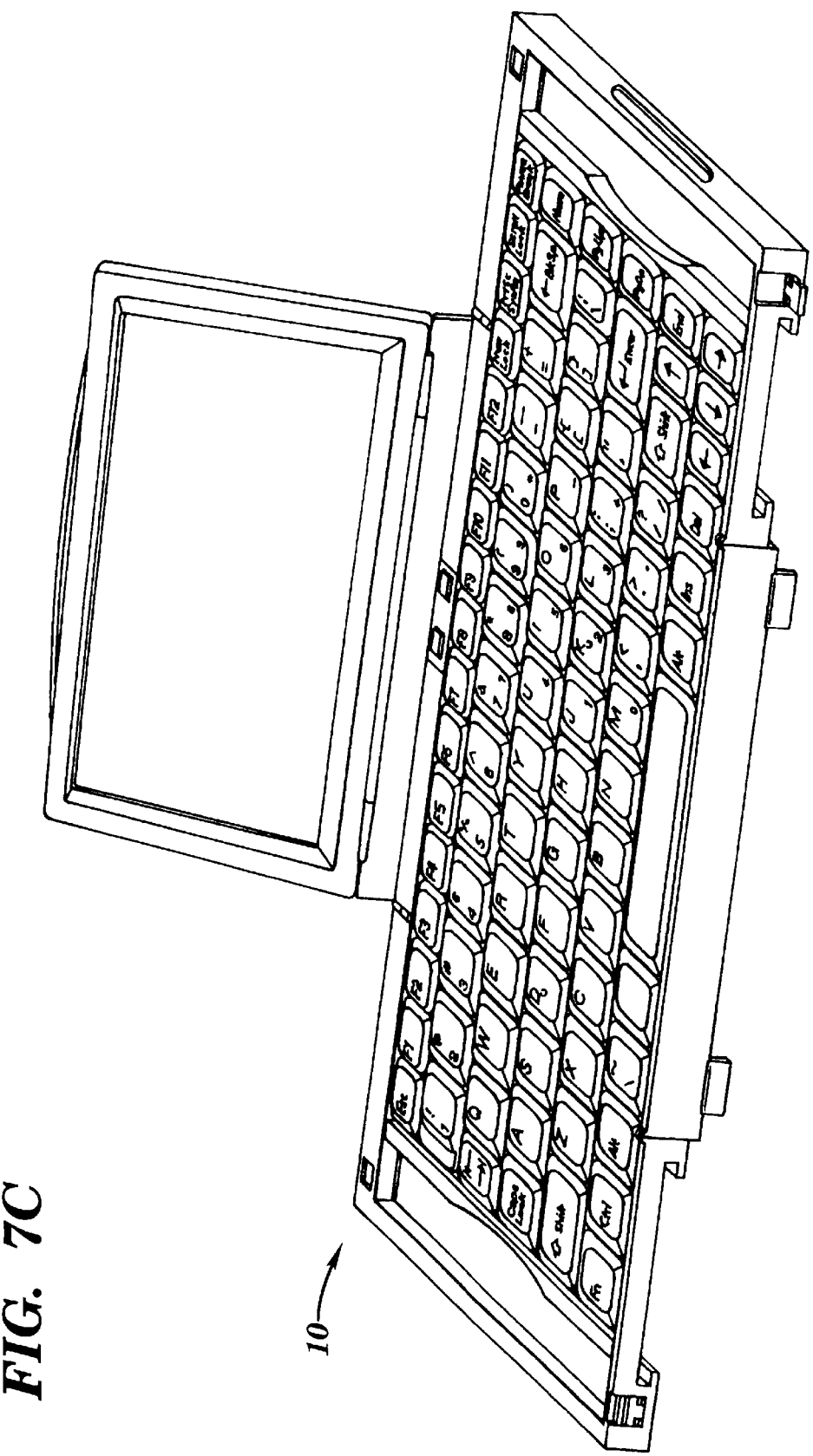
FIG. 7C is a front perspective view of another embodiment of the expandable keyboard in accordance with the present invention in a palmtop computer or similar digital organizer.
Figure 7D:
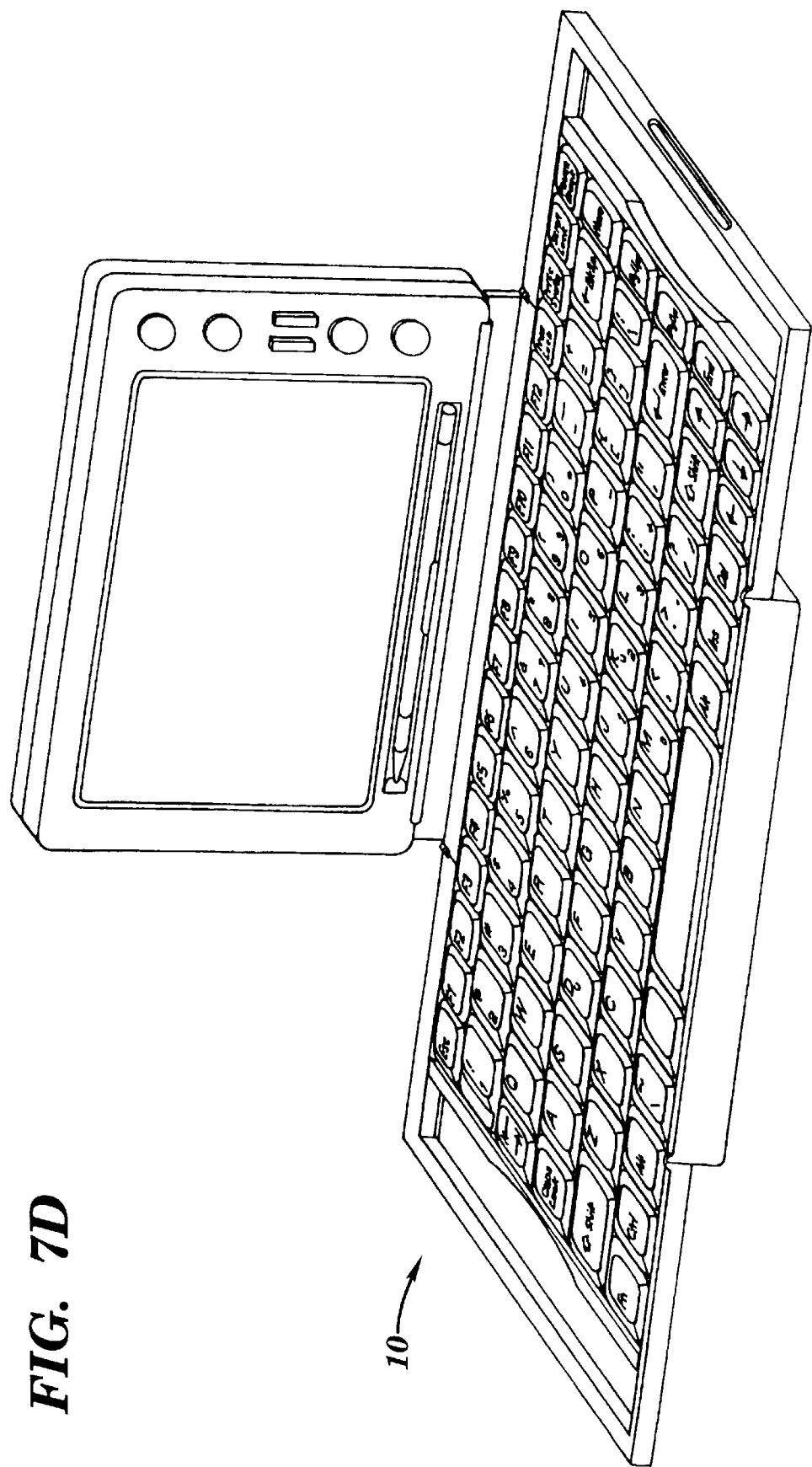
FIG. 7D is front perspective view of another embodiment of the expandable keyboard in accordance with the present invention in a personal digital assistant.
Figure 7E:
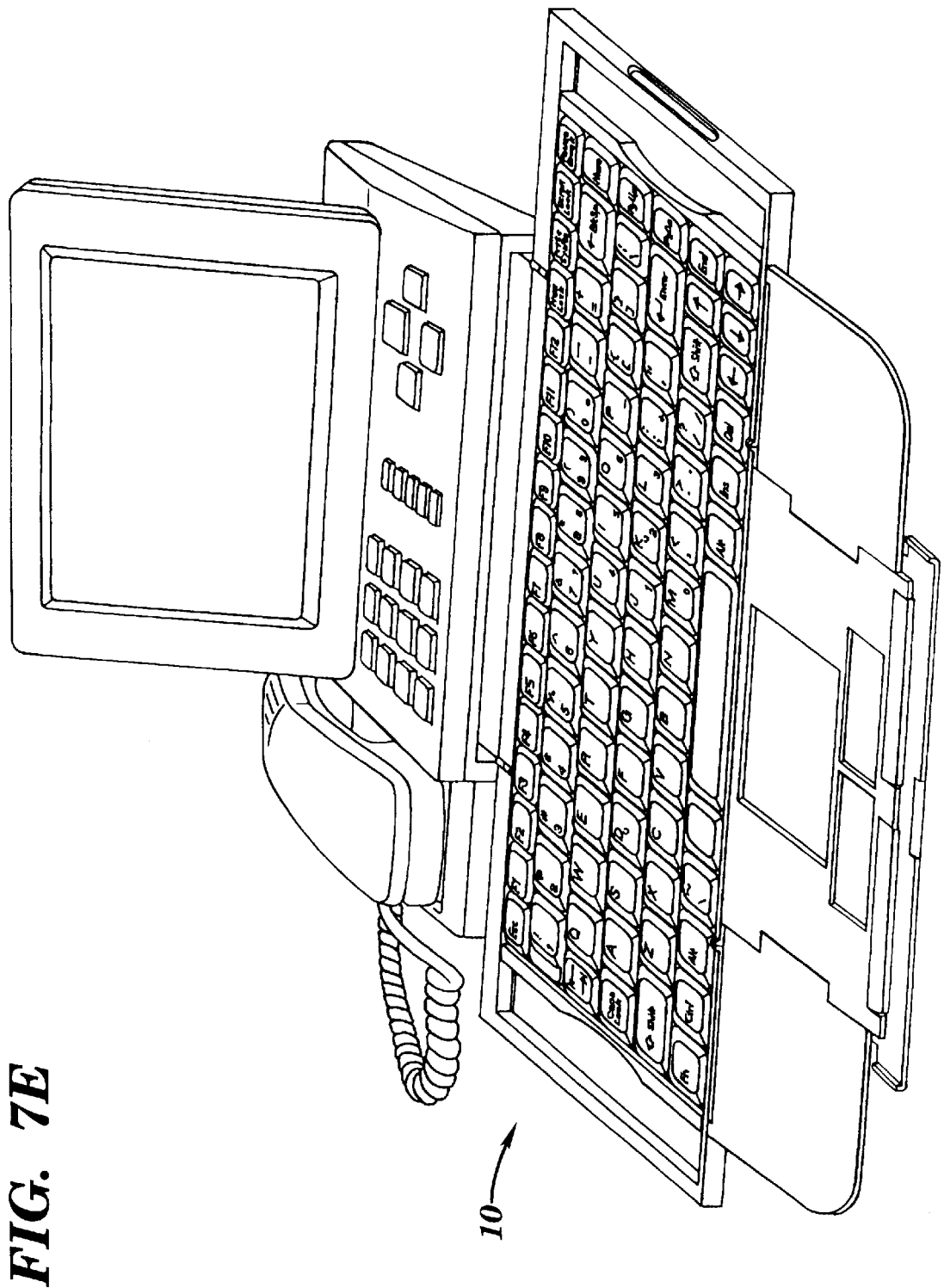
FIG. 7E is a front perspective view of another embodiment of the expandable keyboard in accordance with the present invention in a stationary telephone.
Figure 7F:
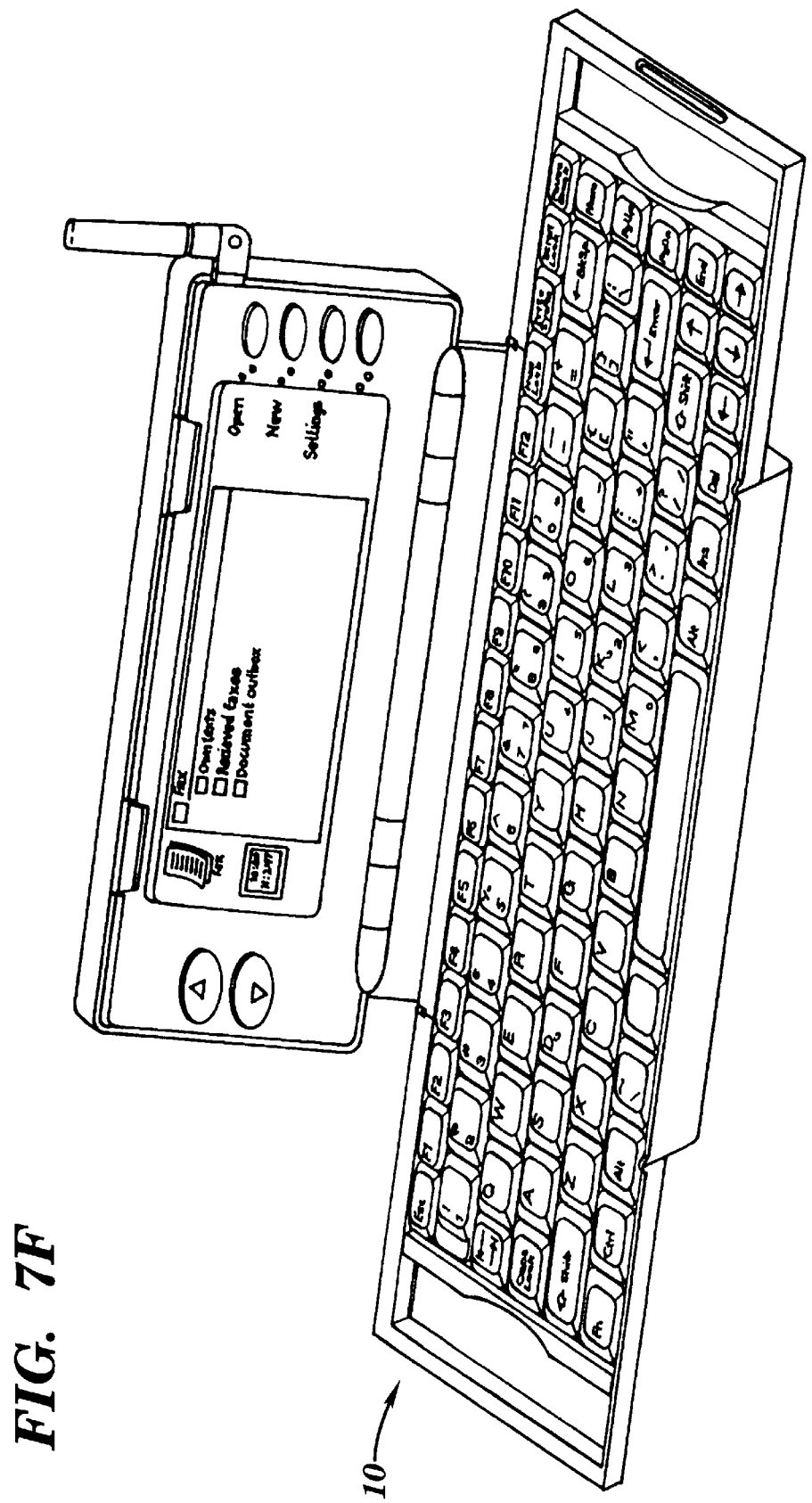
FIG. 7F is a front perspective view of another embodiment of the expandable keyboard in accordance with the present invention in a mobile telephone.
Figure 7G:
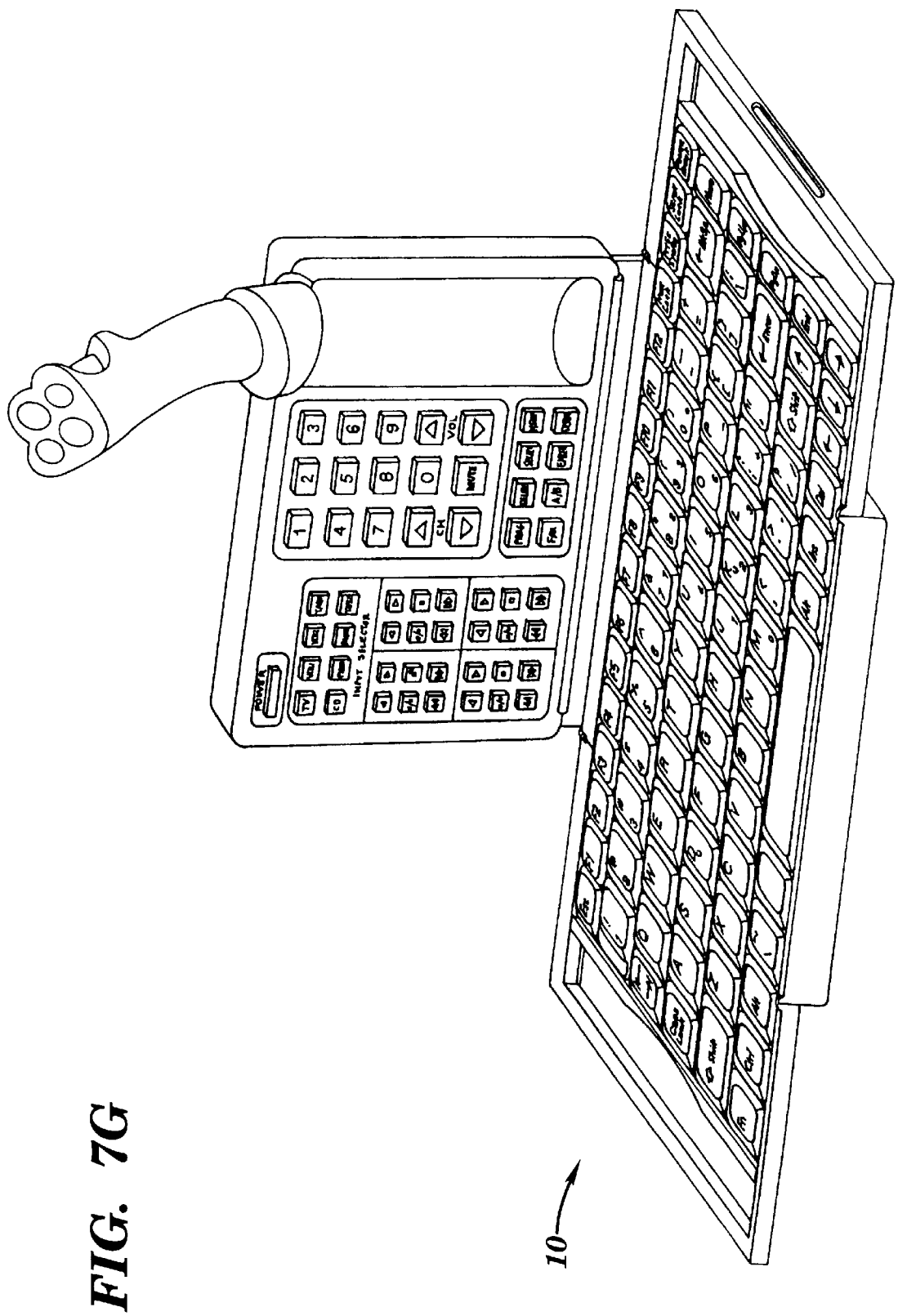
FIG. 7G is a front perspective view of another embodiment of the expandable keyboard in accordance with the present invention with a remote control and a joystick.

Referring to FIGS. 1C, 1D, 5D, 5E, 5G, 5H, 6D, 6E, 6G and 6H, actuating assemblies for moving the segments 18 and 24 for the right and left keyboard assembly 16 and 22 to the first and second positions are illustrated. In this particular embodiment, each actuating assembly includes U-shaped lever 180 and 182 with central shaft 176 and 178 connected at one end to an arm 234 and 236 and coil-spring 240 and 242, which is configured for "over center" operation. One end of the spring 240 for the right keyboard assembly 16 is connected to the arm 234 for the lever 180 for the right keyboard assembly 16 and the other end of the spring 240 is connected to the wing housing 20 for the right keyboard assembly 16 in the position shown. One end of the spring 242 for the left keyboard assembly 22 is connected to the arm 236 for the lever 182 for the left keyboard assembly 22 and the other end of the spring 242 is connected to the wing housing 26 for the left keyboard assembly 22 in the position shown. The central shaft 176 for the right keyboard assembly 16 is pivotally connected to the side wall 192 for wing 20 for the right keyboard assembly 16 and the central shaft 178 for the left keyboard assembly 22 is pivotally connected to the side wall 194 for wing 26 for the left keyboard assembly 22. In operation, the springs 240 and 242 are positioned such that they tend to maintain the position of the levers 180 and 182 in the positions they are placed by the user. When the levers are placed into the "outboard" position, the spring is acting from one side to bias towards that position. When the levers have been actuated to the "inboard" or first position, as shown in FIGS. 5G and 6G, the spring crosses over the pivot point ("over center") and biases the lever in that position.

The bottom surface 244 of the segment 18 for the right keyboard assembly 16 also includes a notched area 248 which contains a track in which a protrusion on the second arm 234 for the right keyboard assembly 16 rides. The bottom surface 246 of the keyboard-base 24 for the left keyboard assembly 22 also includes a notched area 250 which contains a track in which a protrusion on the second arm 236 for the left keyboard assembly 22 rides. Although one type of manual actuating assembly, is illustrated, other types of manual or automatic actuating assemblies could be used as needed or desired. One example of another means of actuation includes a spring loaded mechanism which tends to pull the segments 18 and 24 outward, biasing them to the position for storage, combined with a latching mechanism that retains the sliding segments 18 and 24 in the operating position when manually pushed to that position by the operator, tensioning the spring. The segments 18 and 24 are subsequently released and thus slid to the storage positions by a push button integrated into the outside edge surfaces of the housings. Another example would be an automatic mechanism operating via an internal linkage operating between the edges of the wings and central keyboard section, internal to the wings and central section.

Although in this particular embodiment, the expandable keyboard 10 is illustrated with a central keyboard assembly 14, a right keyboard assembly 16, and a left keyboard assembly 22, other arrangements of sliding and folding sections for the expandable keyboard 10 are within the scope of this invention. For example, expandable keyboard 10 may only have a central keyboard assembly 14 and either a right keyboard assembly 16 or a left keyboard assembly 22 or the expandable keyboard 10 may have a central keyboard assembly 14 and either or both a forward keyboard assembly and a backward keyboard assembly which would be analogous to the right and left keyboard assemblies 16 and 22, but would fold in from the front and back instead of the sides. Additionally, although in this particular embodiment the expandable keyboard 10 is illustrated with a portable computer 12, the expandable keyboard 10 can be used with a variety of different portable and stationary applications, such as palmtop computers, notebook and sub-notebook computers, digital organizers, digital cameras, mobile phones, camcorders, video consumer game electronics, video cassette recorders, calculators, and stationary telephones, and, in general, any application desiring to minimize the storage volume and area of a keyboard which can benefit from deploying the largest practical keyboard size to facilitate typing. In this embodiment, a standard size keyboard is deployed. However, pocket-size and other small products may deploy the same concepts to realize a keyboard with a smaller unfolded size.

Figure 1B:
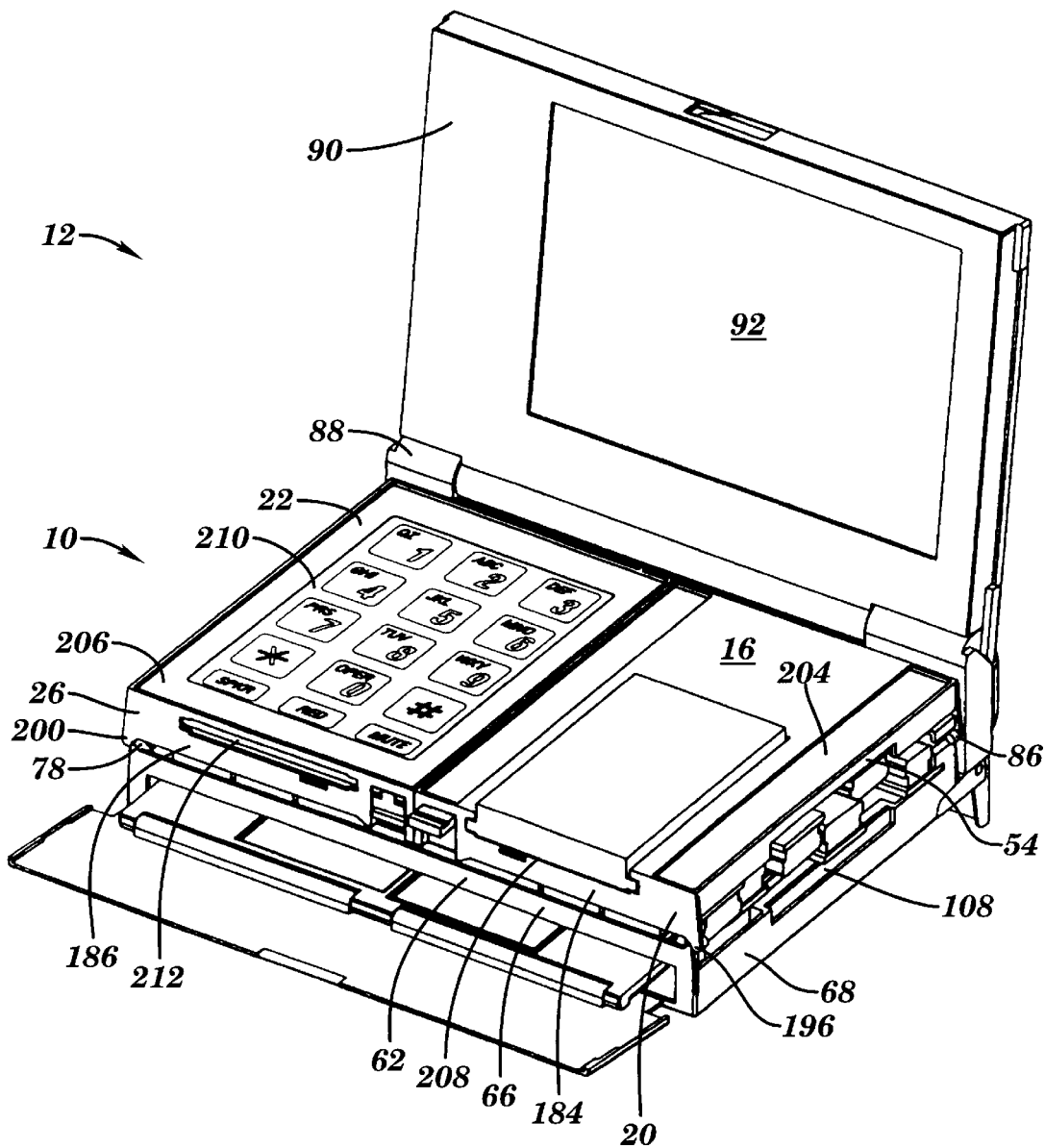
FIG. 1B is a front perspective view of the expandable keyboard in the portable computer in a partially open position.

Referring to FIGS. 1A and 1B, hinged side cover 245 can be rotated to a first position by pivoting it about hinge 260. To do this, the operator grasps protrusion 262. In this first position it is stored in recess 264 with clearance provided by notch 249. Cover 245 can also be rotated to a second position, covering the side walls 68 of the platform 62 and side edge 54 of first wing 20 for transport or storage. Cover 245 is retained in the first and second positions by a detent (not shown) or by friction from the hinge. Likewise the left side cover 268 is operated in an identical manner, using corresponding recess 247, notch 251 and hinge 253. Although in this particular embodiment, a side cover hinged at the top is shown, other designs which take advantage of the flat surface presented by side edge 54 and side wall 68 are possible.

The operation of this particular embodiment of the expandable keyboard 10 in a portable computer 12 is discussed below. During storage and transport, the cover 90 for the portable computer 12 is pivoted down to rest on the right and left keyboard assemblies 16 and 22 as shown in FIG. 1A. A latching mechanism (not shown) may be used to hold the cover 90 in place. Also, side covers 245 and 266 are pivoted down to cover the sides. When the side covers 245 and 266 are pivoted to the first position, cover 90 can be pivoted open, as shown in FIG. 1B. This affords the user has access to the electronic components on the bottom structures 204 and 206 of the wings 20 and 26 for the right and left keyboard assemblies 16 and 22 which are now exposed.

In the closed position, the keys 28, 32, and 34 on the central keyboard assembly 14, right keyboard assembly 16, and left keyboard assembly 22 are disconnected and may be depressed to further minimize the overall size of the expandable keyboard 10 during storage. Another latching mechanism (not shown) may be used to hold the right and left keyboard assemblies 16 and 22 in the closed position. Note that with the cover 90 open, but with the keyboard in the folded position of FIG 1B, devices located in the movable wing sections are still electrically connected into the computer main board 37 as previously described via electrical connectors 150, 152, 195, and 197. This permits additional operating capabilities. For example, a "speakerphone" may be implemented in this mode using a keypad microphones, speakers, internal circuitry or removable modules such as PCMCIA cards to provide the operating circuitry. The PCMCIA card, can, for example, provide a wired or wireless connection to other devices or communications infrastructure, or perform any other function that can be implemented in the available space.

Figure 1C:
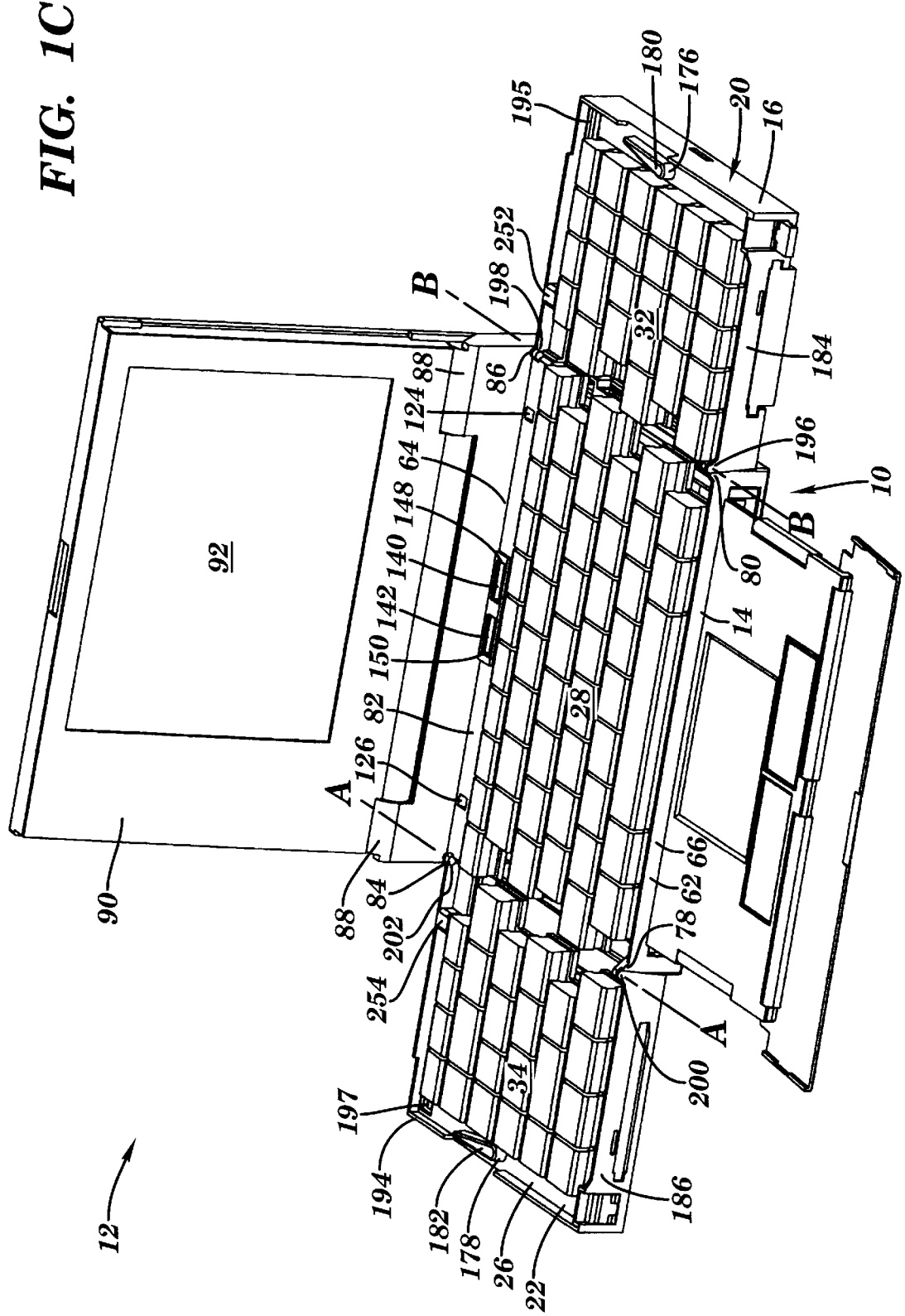
FIG. 1C is a front perspective view of the expandable keyboard in a fully open position with the keyboard-bases in the first position.
Figure 1D:
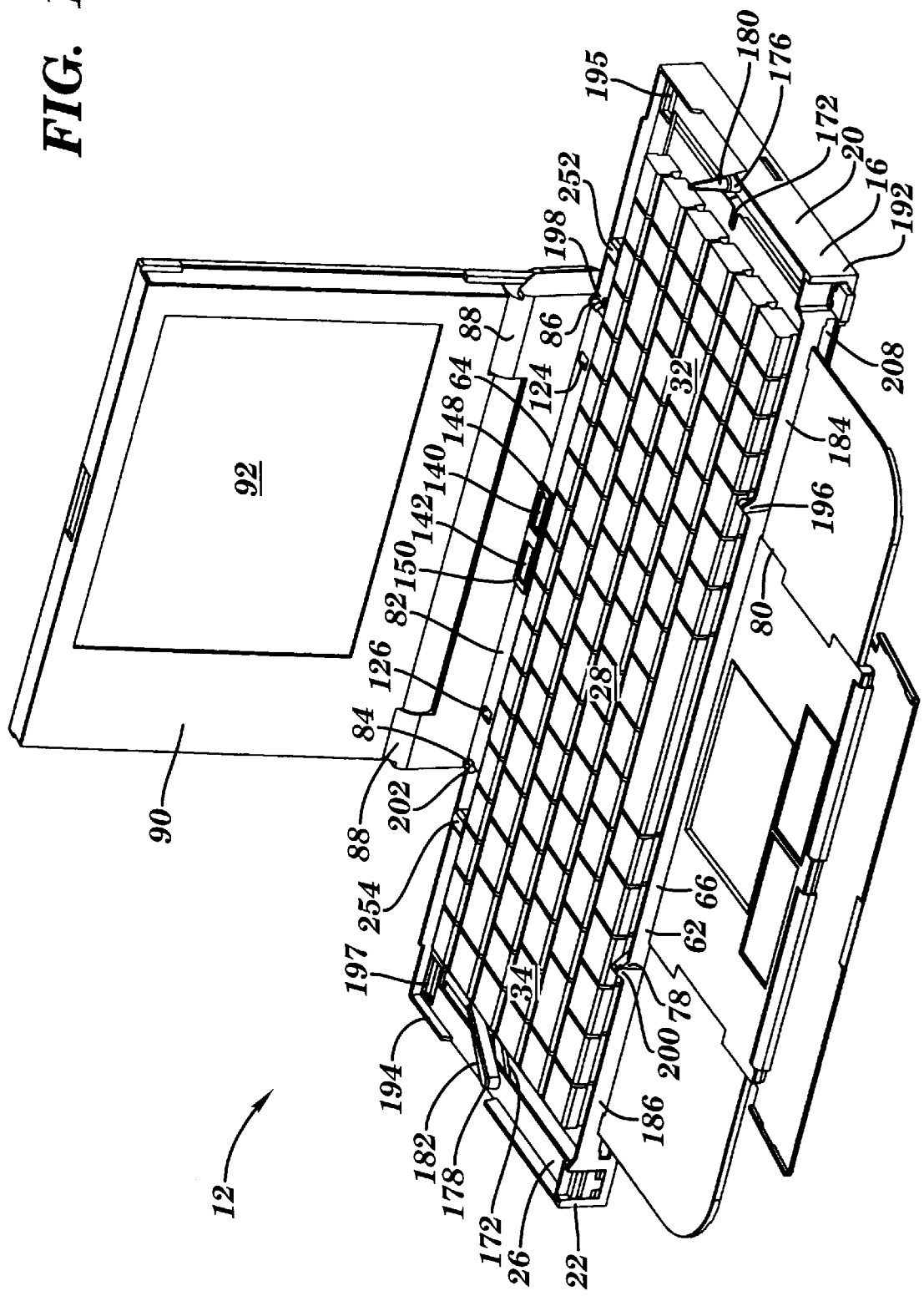
FIG. 1D is a front perspective view of the expandable keyboard in the portable computer in a fully open position with the keyboard-bases in the second position.
Figure 1E:
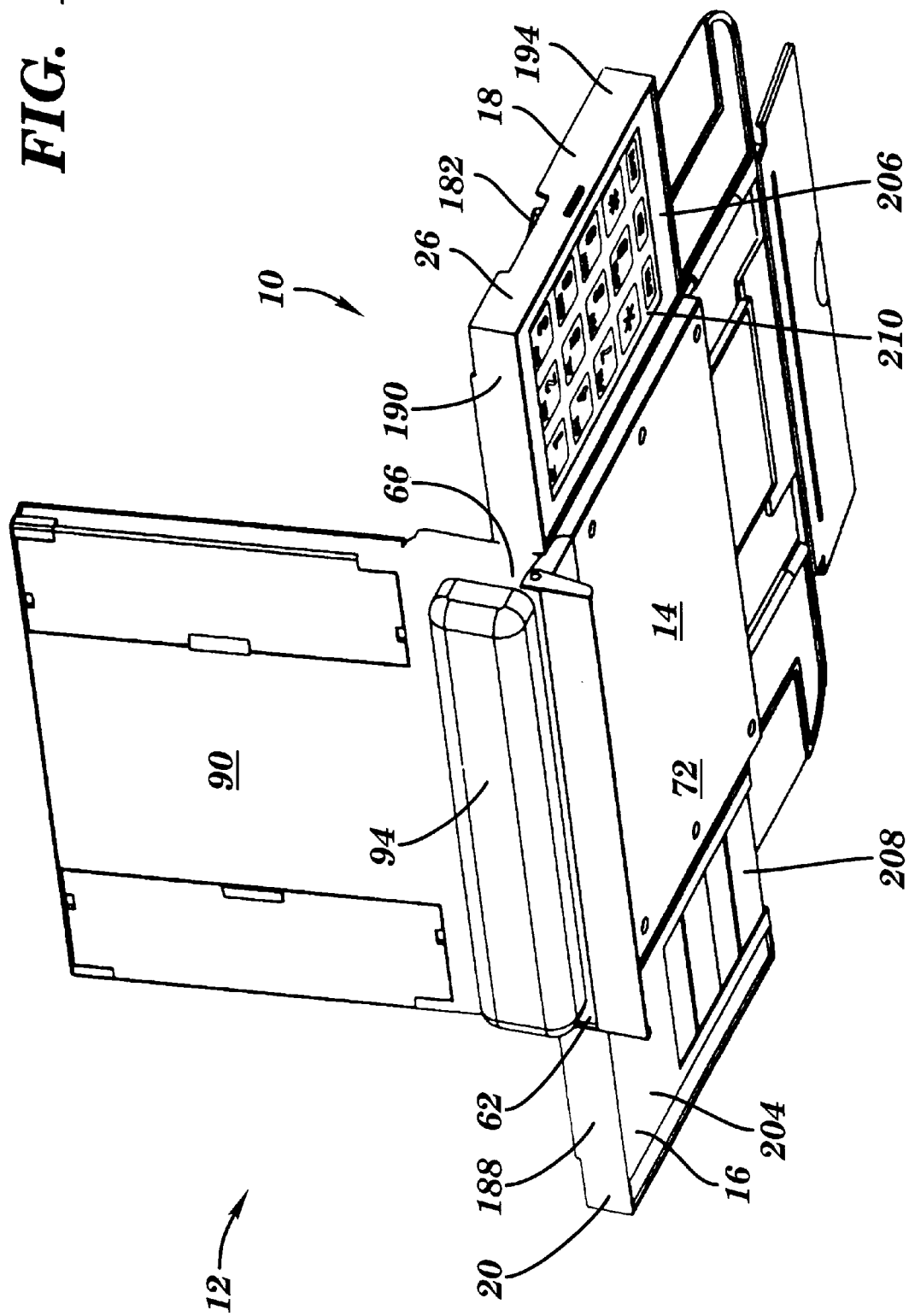
FIG. 1E is a back perspective view of the expandable keyboard in the portable computer in a fully open position.

With the cover 90 open, the right and left keyboard assemblies 16 and 22, and more particularly the wings 20 and 26 for the right and left keyboard assemblies 16 and 22 and the segments 18 and 24 for the right and left keyboard assemblies 16 and 22 are in the first position, can be pivoted about axis A-A and axis B-B between a closed position resting on the central keyboard assembly 14 as shown in FIG. 1B and an open position as shown in FIGS. 1C–1E. Note that a latching mechanism (not shown) may retain the wings 20 and 26 to hold the keyboard keys in compression while retaining the electrical connections previously described on the keyboard top surfaces.

Additionally, in the closed position the projections 252 and 254 (shown in FIGS. 5A, 5E, 6A, and 6E) on the back walls 188 and 190 of the wings 20 and 26 for the right and left keyboard assemblies 16 and 22 engage the with one end of levers 120 and 122 through the openings 124 and 126 in the top strip 82 and push these ends down. When these ends of each lever 120 and 122 are engaged and pushed down the by the projections 252 and 254, one end of the elongated shutters 108 and 110 along with the springs 112 and 114 under the extensions 116 and 118 are pushed down and the other end of the elongated shutters 108 and 110 are pivoted up to shield the first conductive elastomers 96 and 98 as shown in FIGS. 1B and 3B. Also note that an additional electrical signal, not shown, derived from a switch operated by projection 252 and 254 may be used to notify the main circuit board 37 of the closed state of the keyboard, enabling it to "ignore" the inputs from the compressed key switches and partially disconnected keyboard.

Referring to FIGS. 3A–3C, the engagement of the projections 252 and 254 pushing down one end of levers 120 and 122 at the points 124 and 126 also causes the other end of the levers 120 and 122 to pivot up and raise the shorter extension 128 and 130 of each J-shaped structure 132 and 134. Raising the shorter extensions 128 and 130 of each J-shaped structure 132 and 134 causes the longer extensions 136 and 138 of the J-shaped structures 132 and 134 to pivot out against the inner edge of the flat, J-shaped shutters 140 and 142. As a result, the flat, J-shaped shutters 140 and 142 are pivoted away and the openings 148 and 150 in the top strip 82 are exposed. Electrical connectors 152 and 154 coupled to the circuitry 37 on the platform 62 are located on the other end of the levers 120 and 122 and are passed through the openings 148 and 150 when the flat, J-shaped shutters 140 and 142 are pivoted away. These electrical connectors 152 and 154 are coupled to electrical connectors 195 and 197 on the right and left keyboard assemblies 16 and 22 which are coupled to components in the right and left keyboard assemblies 16 and 22. Note that when the keyboard is in the "unfolded" condition, the electrical connectors 195 and 197 are protected from ESD damage because they are hidden under the tracks that captivates the sliding keyboard-bases 18 and 24.

Referring to FIGS. 1C–1E and 3A–3C, the right and left keyboard assemblies 16 and 22 can be pivoted to an open position. When the right and left keyboard assemblies 16 and 22 are pivoted open, the projections 252 and 254 on the wings 20 and 26 of the right and left keyboard assemblies 16 and 22 are no longer engaged with the one end of the levers 120 and 122 which pivot up and electrical connectors 157 and 154 are disconnected from electrical connectors 195 and 197. The springs 112 and 114 under the extensions 116 and 118 at one end of the shutters 108 and 110 are pushed up pivoting the one end up and the other end of the elongated shutters 108 and 110 down to expose the conductive elastomers 96 and 98.

The other end of the levers 120 and 122 is pivoted back down pulling the electrical connectors 152 and 154 down below the openings 148 and 150 in the top strip 82 and disconnecting them. Pivoting the other end of the levers 120 and 122 down lowers the shorter extension 128 and 130 of each J-shaped structure 132 and 134. Lowering the shorter extensions 128 and 130 of each J-shaped structure 132 and 134 causes the longer extensions 136 and 138 of the J-shaped structures 132 and 134 to pivot in and away from the inner edge of the flat, J-shaped shutters 140 and 142. As a result, the flat, J-shaped shutters 140 and 142 are pivoted in and over the openings 148 and 150 in the top strip 82 are exposed.

When the right and left keyboard assemblies 16 and 22 are fully pivoted open, the right and left keyboard assemblies 16 and 22 rest against the side walls of the central keyboard assembly 14 and provide an extension of the central keyboard assembly as shown in FIGS. 1C–1E. In this fully open position, the tops of the keys 28, 32, and 34 in central, right, and left keyboard assemblies 14, 16, and 22 are in substantially the same plane.

The wings 20 and 26 of the right and left keyboard assemblies 16 and 22 can only pivot about the axis A-A and axis B-B, when the keyboard-base 18 and 24 of the right and left keyboard assemblies 16 and 22 are in a first position, shown in FIG. 1C, which exposes the axis A-A and axis B-B. In this first position, the PC board connectors 96A and 98A and the conductive elastomers 96 and 98 on the side walls 68 and 70 of the central keyboard assembly 14 are not electrically coupled to the PC board connectors 104 and 106 on the segments 18 and 24 of the right and left keyboard assemblies 16 and 22.

The segments 18 and 24 for the right and left keyboard assemblies 16 and 22 are moved from the first position to the to the second position, by turning levers 180 and 182 towards the central keyboard assembly 14 which causes the arm 234 and 236 to push against one side of the notched area 248 and 250, as shown in FIGS. 5D, 5G, and FIG. 6D. The lips 222 and 226 of keyboard-base 18 for the right keyboard assembly 16 slide along the tracks 218 and 214 in the wing 20 to the second position where the keys 28 and 32 of the central keyboard assembly 14 and the right keyboard assembly 16 interlock and the PC board connector 96A and PC board connector 104 are electrically coupled via conductor elastomer 96. The lips 224 and 228 of keyboard-base 24 for the left keyboard assembly 22 slide along the tracks 220 and 216 in the wing 26 to the second position where the keys 28 and 34 of the central keyboard assembly 14 and the left keyboard assembly 26 interlock and PC board connector 98A and PC board connector 106 are electrically coupled via conductive elastomer 98. The components on the right and left keyboard assemblies 16 and 22 are coupled through the PC board connectors 96A, 98A, 104, and 106 and conductive elastomers 96 and 98 to the circuitry 37 in the electronic product, which in this case is the circuitry 37 on the floor 72 of the platform 62. Meanwhile, electrical connector 195 and 197 are slid out of windows 191 and 193 to protect these connectors. With the segments 18 and 24 of the right and left keyboard assemblies 16 and 22 in the second position, the axis A-A and the axis B-B are covered and the wings 20 and 26 for the right and left keyboard assemblies 16 and 22 substantially can not pivot. As a result, a sturdy, standard size keyboard is formed.

To move the segments 18 and 24 for the right and left keyboard assemblies 16 and 22 back to the first position, the levers 180 and 182 are simply turned in the opposite direction which causes the arm 234 and 236 to push against an opposing side of the notched area 248 and 250. The lips 222 and 226 of keyboard-base 18 for the right keyboard assembly 16 slide along the tracks 218 and 214 in the wing 20 back to the first position where the keys 28 and 32 of the central keyboard assembly 14 and the right keyboard assembly 16 are split apart and the conductive elastomer 96 and PC board connector 104 are disconnected. The lips 224 and 228 of keyboard-base 24 for the left keyboard assembly 22 slide along the tracks 220 and 216 in the wing 26 back to the first position where the keys 28 and 34 of the central keyboard assembly 14 and the left keyboard assembly 22 are split apart and the conductive elastomer 98 and the PC board connector 106 are disconnected. Meanwhile, electrical connectors 195 and 197 are slid into windows 191 and 193. In the first position, the right and left keyboard assemblies 16 and 22 can be folded in for storage.

Although a manual system is used to move the segments 18 and 24 in the right and left keyboard assemblies 16 and 22 in this particular embodiment, other types of manual or automatic actuating assemblies could be used, as previously noted. Additionally, although the pivoting movement of the wings 20 and 26 and the sliding movement of the segments 18 and 24 for the right and left keyboard assemblies 16 and 22 are described together in this particular example, it will be readily apparent to those skilled in the art that the wings 20 and 26 and/or the segments 18 and 24 of the right and left keyboard assemblies 16 and 22 can be pivoted and slid separately as needed or desired.

FIGS. 7A–7G are alternative applications illustrating uses of the expandable keyboard. The elements are the same as indicated in the detailed descriptions.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. An expandable keyboard comprising:
 a central keyboard assembly comprising a plurality of first rows of keys and a platform; and
 a first assembly comprising a first segment with a plurality of second rows of keys and a first wing;
 the first wing pivotally connected along one side to one side of the platform about a first axis, the first wing pivotable about the first axis which extends along the one side of the first wing and the one side of the platform to a closed position where the first wing rests substantially on the platform and to an open position where the first wing provides an extension of the platform;

the first segment being slidably connected to the first wing, the first segment with the second rows of keys moveable to a first position which exposes the first axis and permits the first wing to pivot about the first axis and to a second position which covers the first axis to substantially prevent the first wing from pivoting about the first axis and where one end of the first rows of keys on the central keyboard assembly meshes with one end of the second rows of keys on the second segment.

2. The expandable keyboard as set forth in claim 1 further comprising a first track in the first assembly, the first segment mounted to ride in the first track.

3. The expandable keyboard as set forth in claim 1 further comprising a first actuating mechanism in the first assembly for moving the first segment with respect to the first wing to at least the first and second positions.

4. The expandable keyboard as set forth in claim 3 wherein the first actuating mechanism comprises a lever which is used to move the first segment.

5. The expandable keyboard as set forth in claim 1 further comprising:

one or more central electrical connectors connected to the platform; and a first side electrical connector connected to the first assembly, the first side electrical connector coupled to one or more components connected to the first assembly, wherein the first side electrical connector is coupled to one of the central electrical connectors when the first segment is slid in substantially one direction into the second position along the first wing.

6. The expandable keyboard as set forth in claim 5 further comprising a first top electrical connector connected to the first assembly, the first top electrical connector coupled to one or more components connected to the first assembly, wherein the first top electrical connector is coupled to one of the central electrical connectors when the first segment is in the first position and the first wing is pivoted to a closed position.

7. The expandable keyboard as set forth in claim 6 wherein the components in the first assembly are the keys on the first segment.

8. The expandable keyboard as set forth in claim 6 wherein the components in the first assembly are the keys on the first segment and a slot for receiving electronic cards on the first wing.

9. The expandable keyboard as set forth in claim 6 further comprising one or more shutters, each of the shutters connected to the platform and moveable between positions covering and exposing one or more of the central electrical connectors.

10. The expandable keyboard as set forth in claim 6 further comprising a first wing electrical connector on the first segment in the first wing, the first wing electrical connector being exposed through a window in the first wing when the first segment is in the first position and being covered under a first track when the first segment is in the second position.

11. The expandable keyboard as set forth in claim 1 further comprising:

a second assembly comprising a second segment with a plurality of third rows of keys and a second wing;

the second wing pivotally connected along one side to one side of the platform about a second axis, the second wing pivotable about the second axis which extends along the one side of the second wing and another side of the platform to a closed position where the second wing rests substantially on the platform and to an open position where the second wing provides an extension of the platform;

the second segment being slidably connected to the second wing, the second segment with the third rows of keys moveable to a first position which exposes the second axis and permits the second wing to pivot about the second axis and to a second position which covers the second axis to substantially prevent the second wing from pivoting about the second axis and where another end of the first rows of keys on the central keyboard assembly meshes with one end of the third rows of keys on the second segment.

12. The expandable keyboard as set forth in claim 11 further comprising:

a first actuating mechanism in the first assembly for moving the first segment with respect to the first wing to at least the first and second positions; and a second actuating mechanism in the second assembly for moving the second segment with respect to the second wing to at least the first and second positions.

13. The expandable keyboard as set forth in claim 12 wherein the first actuating mechanism comprises a first lever which is used to move the first segment to the second position and the second actuating mechanism comprises a second lever which is used to move the second segment.

14. The expandable keyboard as set forth in claim 11 further comprising:

a first track in the first wing, the first segment mounted to ride in the track in the first wing; and a second track in the second wing, the second segment mounted to ride in the track in the second wing.

15. The expandable keyboard as set forth in claim 11 further comprising:

one or more central electrical connectors connected to the platform; a first side electrical connector connected to the first assembly, the first side electrical connector coupled to one or more components connected to the first assembly, wherein the first side electrical connector is coupled to the one of the central electrical connectors when the first segment is slid into the second position along the first wing; and a second side electrical connector connected to the second assembly, the second side electrical connector coupled to one or more components connected to the second assembly, wherein the second side electrical connector is coupled to the one of the central electrical connectors when the second segment slid in substantially one direction into the second position along the second wing.

16. The expandable keyboard as set forth in claim 15 further comprising:

a first top electrical connector connected to the first assembly, the first top electrical connector coupled to one or more of the components connected to the first assembly, wherein the first top electrical connector is coupled to one of the central electrical connectors when the first segment is in the first position and the first wing is pivoted to a closed position; and the second top electrical connector connected to the second assembly, the second top electrical connector coupled to one or more of the components connected to the second assembly, wherein the first top electrical connector is coupled to one of the central electrical connectors when the second segment is in the first position and the second wing is pivoted to a closed position.

17. The expandable keyboard as set forth in claim 11 further comprising shutters connected to the platform and moveable between positions covering and exposing the central electrical connectors.

18. The expandable keyboard as set forth in claim 11 further comprising:

a first wing electrical connector on the first segment in the first wing, the first wing electrical connector being exposed through a first window when the first segment in the first wing is in the first position and being covered under a first track when the first segment is in the second position; and a second wing electrical connector on the second segment in the second wing, the second wing electrical connector being exposed through a second window when the second segment in the second wing is in the first position and being covered under a second track when the second segment is in the second position.

19. A keyboard comprising:

a central assembly comprising a plurality of first rows of keys, one or more central electrical connectors and a platform; and a first assembly comprising a first segment with a plurality of second rows of keys, a first wing, a first top electrical connector, and a first side electrical connector, the keys in the second rows coupled to the first top and side electrical connectors;

the first wing pivotally connected to the platform about a first axis;

the first segment being slidably connected to the first wing, the first segment with the second rows of keys moveable to a first position which exposes the first axis and permits the first wing to pivot about the first axis and to a second position which covers the first axis to substantially prevent the first wing from pivoting about the first axis and where one end of the first rows of keys on the central keyboard assembly meshes with one end of the second rows of keys on the second segment;

the first top electrical connector being connected to the first assembly and is coupled to one of the central electrical connectors when the first segment is in the first position and the first wing is pivoted to the closed position and is coupled to another one of the central electrical connectors when the first segment is in the second position and the first wing is pivoted to the open position.

20. The keyboard as set forth in claim 19 further comprising:

a second assembly comprising a second segment with a plurality of third rows of keys, a second wing, a second top electrical connector, a second side electrical connector, the keys in the third rows coupled to the second top and side electrical connectors;

the second wing pivotally connected to the platform about a second axis;

the second segment being slidably connected to the second wing, the second segment with the third rows of keys moveable to a first position which exposes the second axis and permits the second wing to pivot about the second axis and to a second position which covers the second axis to substantially prevent the second wing from pivoting about the second axis and where another end of the first rows of keys on the central keyboard assembly meshes with one end of the third rows of keys on the second segment; and the second top electrical connector being connected to the second assembly and is coupled to one the central electrical connectors when the second segment is in the first position in the second wing is pivoted to the closed position and is coupled to another one of the central electrical connectors when the second segment is in the second position and the second wing is pivoted to the open position.

21. The keyboard as set forth in claim 20 further comprising:

a first actuating mechanism in the first assembly for moving the first segment with respect to the first wing to the first and second positions; and a second actuating mechanism in the second assembly for moving the second segment with respect to the second wing to the first and second positions.

22. The keyboard as set forth in claim 20 further comprising shutters connected to the platform and moveable between positions covering the central electrical connectors.

23. The expandable keyboard as set forth in claim 20 further comprising:

a first wing electrical connector on the first segment in the first wing, the first wing electrical connector being exposed through a first window in the first wing when the first segment in the first wing is in the first position and being covered under a first track when the first segment is in the second position; and a second wing electrical connector on the second segment in the second wing, the second wing electrical connector being exposed through a second window in the second wing when the second segment in the second wing is in the first position and being covered under a second track when the second segment is in the second position.

24. A personal computer comprising:

a keyboard cover;

a central keyboard assembly comprising a plurality of first rows of keys, computer operating components, one or more central connectors and a platform, the display, the keys in the first rows and the central connectors each coupled to the computer operating components; and a first assembly comprising a first segment with a plurality of second rows of keys, a first wing, and a first connector, the keys in the second rows coupled to the first connector;

the first wing pivotally connected to the platform about a first axis;

the first segment being slidably connected to the first wing, the first segment with the second rows of keys moveable to a first position which exposes the first axis and permits the first wing to pivot about the first axis which extends along one side of the first wing and one side of the platform and to a second position which covers the first axis to substantially prevent the first wing from pivoting about the first axis, where one end of the first rows of keys on the central keyboard assembly meshes with one end of the second rows of keys on the second segment and which couples the first connector to one of the central connectors.

25. The computer as set forth in claim 24 further comprising:

a second assembly comprising a second segment with a plurality of third rows of keys, a second wing, and a second connector, the keys in the third rows coupled to the second connector;

the second wing pivotally connected to the platform about a second axis;

the second segment being slidably connected to the second wing, the second segment with the third rows of keys moveable to a first position which exposes the second axis and permits the second wing to pivot about the second axis which extends along one side of the second wing and another side of the platform and to a second position which covers the second axis to substantially prevent the first wing from pivoting about the second axis, where another end of the first rows of keys on the central keyboard assembly meshes with one end of the third rows of keys on the second segment, and which couples the second connector to one of the central connectors.

26. The computer as set forth in claim 25 further comprising:

a first top connector connected to the first assembly, the first top connector coupled to the keys in the second rows, wherein the first top connector is coupled to one of the central connectors when the first segment is in the first position and the first wing is pivoted to a closed position; and the second top connector connected to the second assembly, the second top connector coupled to the keys in the third rows, wherein the first top connector is coupled to one of the central connectors when the second segment is in the first position and the second wing is pivoted to a closed position.

27. The computer as set forth in claim 26 wherein:

the first top connector is located on the first segment in the first wing, the first top connector being exposed through a window in the first wing when the first segment is in the first position and being covered under a first track when the first segment is in the second position; and the second top connector is located on the second segment in the second wing, the second top connector being exposed through a window in the second wing when the second segment is in the first position and being covered under a second track when the second segment is in the second position.

28. The computer as set forth in claim 25 further comprising:

a first actuating mechanism in the first assembly for moving the first segment with respect to the first wing to the first and second positions; and a second actuating mechanism in the second assembly for moving the second segment with respect to the second wing to the first and second positions.

29. The computer as set forth in claim 25 further comprising a first shutter connected to the platform adjacent the first axis and a second shutter connected to the platform adjacent the second axis, the first and second shutters moveable between positions covering and exposing the central connectors.

30. The computer set forth in claim 25, further comprising side covers pivotally connected to the keyboard cover and moveable to a position covering left and right edges of the central keyboard assembly and of the first and second assembly.

* * * * *

UNITED STATES PATENT AND TRADEMARK OFFICE
CERTIFICATE OF CORRECTION

PATENT NO. : 5,995,025
DATED : November 30, 1999
INVENTOR(S) : Sternglass et al.

It is certified that error appears in the above-identified patent and that said Letters Patent is hereby corrected as shown below:

Column 17,
Line 9, "second segment" should read -- first segment --.

Column 19,
Line 36, "second segment" should read -- first segment --.

Column 20,
Line 56, "second segment" should read -- first segment --.

Signed and Sealed this

Thirtieth Day of July, 2002

Attest:

JAMES E. ROGAN
Attesting Officer     Director of the United States Patent and Trademark Office